United States Patent
Hayashi

(10) Patent No.: US 8,737,476 B2
(45) Date of Patent: May 27, 2014

(54) IMAGE DECODING DEVICE, IMAGE DECODING METHOD, INTEGRATED CIRCUIT, AND PROGRAM FOR PERFORMING PARALLEL DECODING OF CODED IMAGE DATA

(75) Inventor: Yoshiteru Hayashi, Kyoto (JP)

(73) Assignee: Panasonic Corporation, Osaka (JP)

( * ) Notice: Subject to any disclaimer, the term of this patent is extended or adjusted under 35 U.S.C. 154(b) by 942 days.

(21) Appl. No.: 12/812,134

(22) PCT Filed: Oct. 20, 2009

(86) PCT No.: PCT/JP2009/005476
§ 371 (c)(1),
(2), (4) Date: Jul. 8, 2010

(87) PCT Pub. No.: WO2010/052837
PCT Pub. Date: May 14, 2010

(65) Prior Publication Data
US 2010/0284468 A1 Nov. 11, 2010

(30) Foreign Application Priority Data
Nov. 10, 2008 (JP) ................. 2008-287320

(51) Int. Cl.
*H04N 7/12* (2006.01)
(52) U.S. Cl.
USPC .................................. 375/240.16
(58) Field of Classification Search
USPC .................................. 375/240.16
See application file for complete search history.

(56) References Cited

U.S. PATENT DOCUMENTS

| 5,532,744 A * | 7/1996 | Akiwumi-Assani et al. ................. 348/390.1 |
| 5,557,332 A * | 9/1996 | Koyanagi et al. ........ 375/240.16 |
| 2006/0093042 A1 | 5/2006 | Kashima et al. |
| 2007/0189618 A1* | 8/2007 | Bivolarski et al. ............ 382/234 |

(Continued)

FOREIGN PATENT DOCUMENTS

| JP | 2006-129284 | 5/2006 |
| JP | 2007-318517 | 12/2007 |

OTHER PUBLICATIONS

International Search Report issued Jan. 12, 2010 in International (PCT) Application No. PCT/JP2009/005476.

(Continued)

*Primary Examiner* — Sath V Perungavoor
*Assistant Examiner* — James Pontius
(74) *Attorney, Agent, or Firm* — Wenderoth, Lind & Ponack, L.L.P.

(57) ABSTRACT

An image decoding device capable of performing parallel decoding of coded image data with a small memory bandwidth while suppressing momentary increase in the amount of data transferred for the decoding. An image decoding device (100) includes: an external memory (110) which stores data of reference images; a stream parser unit (120) which decodes reference information indicating the number of reference images to be referred to on a block-by-block basis; an amount-of-transferred-data prediction unit (131) which calculates, on a block-by-block basis using the reference information, a predictive data amount of a reference image to be read out from the external memory (110); a block determination unit (132) which determines, using the predictive data amount, multiple blocks to be decoded in parallel, so as to reduce variation in amounts of data read out from the external memory (110); and macroblock decoding units (140 to 160) which decode the determined blocks in parallel.

16 Claims, 28 Drawing Sheets

(56) References Cited

U.S. PATENT DOCUMENTS

| | | | |
|---|---|---|---|
| 2007/0286288 A1* | 12/2007 | Smith et al. | 375/240.24 |
| 2008/0181522 A1* | 7/2008 | Hosaka et al. | 382/251 |
| 2010/0002765 A1* | 1/2010 | Kondo et al. | 375/240.12 |
| 2011/0188769 A1* | 8/2011 | Fuchie et al. | 382/252 |
| 2011/0305400 A1* | 12/2011 | Song et al. | 382/233 |
| 2012/0027314 A1* | 2/2012 | Lee et al. | 382/233 |

OTHER PUBLICATIONS

J. Chong et al., "*Efficient Parallelization of H.264 Decoding with Macro Block Level Scheduling*", Proc. of IEEE Int. Conf. on Multimedia and Expo, Jul. 2, 2007, pp. 1874-1877.

Yasuhiro Watanabe et al., "*Keitai Kiki Muke Tei Shohidenryoku MPEG-4 ASP CODEC Macro*", ITE Technical Report (Mar. 11, 2005), vol. 29, No. 21, pp. 29-32.

* cited by examiner

FIG. 8

| mb_type | Name of mb_type | NumMbPart (mb_type) | MbPartWidth (mb_type) | MbPartHeight (mb_type) | |
|---|---|---|---|---|---|
| 0 | P_L0_16x16 | 1 | 16 | 16 | ⎫ |
| 1 | P_L0_L0_16x8 | 2 | 16 | 8 | ⎬ P-macroblocks |
| 2 | P_L0_L0_8x16 | 2 | 8 | 16 | |
| 3 | P_8x8 | 4 | 8 | 8 | |
| 4 | P_8x8ref0 | 4 | 8 | 8 | ⎭ |
| 5 – 25 | I_XXX | – | – | – | } I-macroblocks |

FIG. 9

| mb_type | Name of mb_type | NumMbPart (mb_type) | MbPartWidth (mb_type) | MbPartHeight (mb_type) | |
|---|---|---|---|---|---|
| 0 | B_Direct_16x16 | na | 8 | 8 | ⎫ |
| 1 | B_L0_16x16 | 1 | 16 | 16 | ⎪ |
| 2 | B_L1_16x16 | 1 | 16 | 16 | ⎪ |
| 3 | B_Bi_16x16 | 1 | 16 | 16 | ⎪ |
| 4 | B_L0_L0_16x8 | 2 | 16 | 8 | ⎪ |
| 5 | B_L0_L0_8x16 | 2 | 8 | 16 | ⎪ |
| 6 | B_L1_L1_16x8 | 2 | 16 | 8 | ⎪ |
| 7 | B_L1_L1_8x16 | 2 | 8 | 16 | ⎪ |
| 8 | B_L0_L1_16x8 | 2 | 16 | 8 | ⎬ B-macroblocks |
| 9 | B_L0_L1_8x16 | 2 | 8 | 16 | ⎪ |
| 10 | B_L1_L0_16x8 | 2 | 16 | 8 | ⎪ |
| 11 | B_L1_L0_8x16 | 2 | 8 | 16 | ⎪ |
| 12 | B_L0_Bi_16x8 | 2 | 16 | 8 | ⎪ |
| 13 | B_L0_Bi_8x16 | 2 | 8 | 16 | ⎪ |
| 14 | B_L1_Bi_16x8 | 2 | 16 | 8 | ⎪ |
| 15 | B_L1_Bi_8x16 | 2 | 8 | 16 | ⎪ |
| 16 | B_Bi_L0_16x8 | 2 | 16 | 8 | ⎪ |
| 17 | B_Bi_L0_8x16 | 2 | 8 | 16 | ⎪ |
| 18 | B_Bi_L1_16x8 | 2 | 16 | 8 | ⎪ |
| 19 | B_Bi_L1_8x16 | 2 | 8 | 16 | ⎪ |
| 20 | B_Bi_Bi_16x8 | 2 | 16 | 8 | ⎪ |
| 21 | B_Bi_Bi_8x16 | 2 | 8 | 16 | ⎪ |
| 22 | B_8x8 | 4 | 8 | 8 | ⎭ |
| 23 – 25 | I_XXX | – | – | – | } I-macroblocks |

FIG. 15

| sub_mb_type | Name of sub_mb_type | NumMbPart (sub_mb_type) | MbPartWidth (sub_mb_type) | MbPartHeight (sub_mb_type) |
|---|---|---|---|---|
| 0 | P_L0_8x8 | 1 | 8 | 8 |
| 1 | P_L0_8x4 | 2 | 8 | 4 |
| 2 | P_L0_4x8 | 2 | 4 | 8 |
| 3 | P_L0_4x4 | 4 | 4 | 4 |

FIG. 16

| sub_mb_type | Name of sub_mb_type | NumMbPart (sub_mb_type) | MbPartWidth (sub_mb_type) | MbPartHeight (sub_mb_type) |
|---|---|---|---|---|
| 0 | B_Direct_8x8 | 4 | 4 | 4 |
| 1 | B_L0_8x8 | 1 | 8 | 8 |
| 2 | B_L1_8x8 | 1 | 8 | 8 |
| 3 | B_Bi_8x8 | 1 | 8 | 8 |
| 4 | B_L0_8x4 | 2 | 8 | 4 |
| 5 | B_L0_4x8 | 2 | 4 | 8 |
| 6 | B_L1_8x4 | 2 | 8 | 4 |
| 7 | B_L1_4x8 | 2 | 4 | 8 |
| 8 | B_Bi_8x4 | 2 | 8 | 4 |
| 9 | B_Bi_4x8 | 2 | 4 | 8 |
| 10 | B_L0_4x4 | 4 | 4 | 4 |
| 11 | B_L1_4x4 | 4 | 4 | 4 |
| 12 | B_Bi_4x4 | 4 | 4 | 4 |

FIG. 17
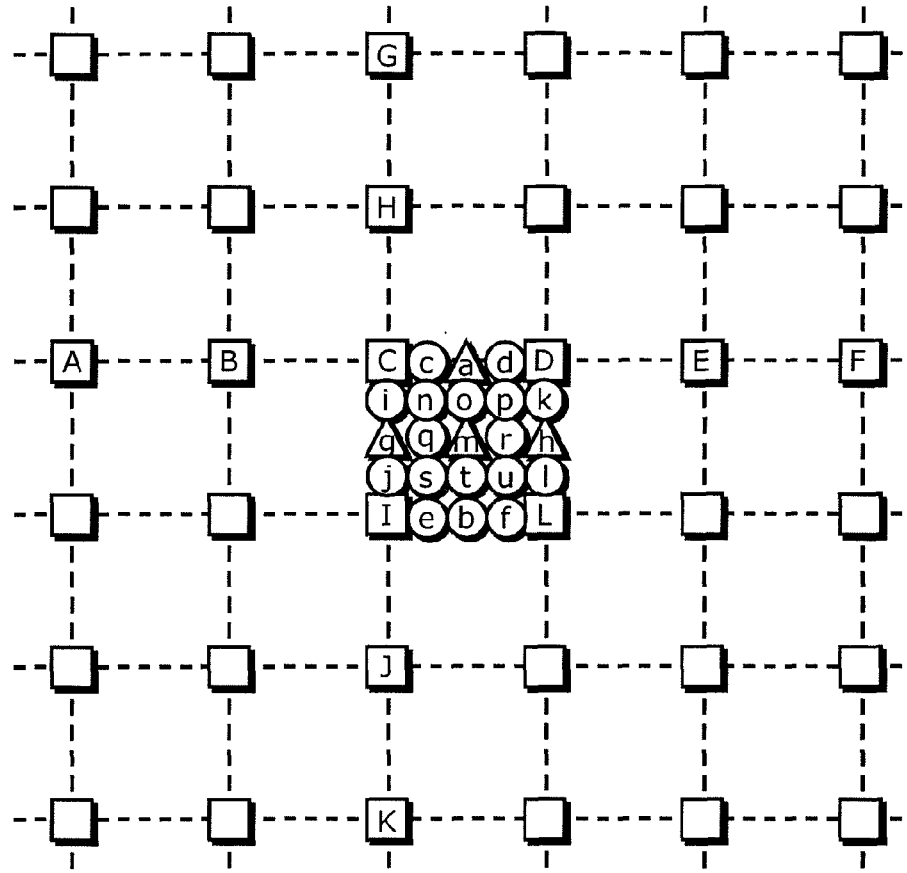
How to calculate pixel value at half-pixel position
a = (A - 5B + 20C + 20D - 5E + F) / 32
g = (G - 5H + 20C + 20I - 5J + K) / 32
How to calculate pixel value at quarter-pixel position
c = (C + a) / 2,   d = (a + D) / 2
i = (C + g) / 2,   j = (g + I) / 2
 Pixel at integer-pixel position
 Pixel at half-pixel position
 Pixel at quarter-pixel position

FIG. 18

| Unit block of motion compensated prediction (pixel × pixel) | Horizontal and vertical positions are both integer-pixel positions | | Horizontal position is sub-pixel position | | Vertical position is sub-pixel position | | Horizontal and vertical positions are both sub-pixel positions | | Predictive data amount |
|---|---|---|---|---|---|---|---|---|---|
| | Size | Data amount | Size | Data amount | Size | Data amount | Size | Data amount | |
| 16×16 | 16×16 | 256 bytes | 21×16 | 336 bytes | 16×21 | 336 bytes | 21×21 | 441 bytes | 361 bytes |
| 16×8 | 16×8 | 128 bytes | 21×8 | 168 bytes | 16×13 | 208 bytes | 21×13 | 273 bytes | 209 bytes |
| 8×16 | 8×16 | 128 bytes | 13×16 | 208 bytes | 8×21 | 168 bytes | 13×21 | 273 bytes | 209 bytes |
| 8×8 | 8×8 | 64 bytes | 13×8 | 104 bytes | 8×13 | 104 bytes | 13×13 | 169 bytes | 121 bytes |
| 8×4 | 8×4 | 32 bytes | 13×4 | 52 bytes | 8×9 | 72 bytes | 13×9 | 117 bytes | 77 bytes |
| 4×8 | 4×8 | 32 bytes | 9×8 | 72 bytes | 4×13 | 52 bytes | 9×13 | 117 bytes | 77 bytes |
| 4×4 | 4×4 | 16 bytes | 9×4 | 36 bytes | 4×9 | 36 bytes | 9×9 | 81 bytes | 49 bytes | ively in use. In addition, recent years have seen increasing use of new coding methods such as H.264/MPEG-4 AVC (ISO/IEC 14496-10) (hereinafter simply referred to as "H.264") and VC-1 (SMPTE 421M).

IMAGE DECODING DEVICE, IMAGE DECODING METHOD, INTEGRATED CIRCUIT, AND PROGRAM FOR PERFORMING PARALLEL DECODING OF CODED IMAGE DATA

TECHNICAL FIELD

The present invention relates to an image decoding device, an image decoding method, an integrated circuit, and a program for decoding coded image data.

BACKGROUND ART

As techniques of compress-coding (hereinafter simply referred to as "coding") video data, MPEG (Motion Pictures Experts Group) coding methods using inter-frame differences are often employed.

The MPEG coding methods make use of the video property that there is a similarity between a current frame and a frame temporally close to the current frame. Taking advantage of this property, the data amount can be reduced by predicting the current frame from the temporally-close frame and coding the difference between the input image and the predicted image.

In general, a movement of an object in a frame and/or panning of a camera create a motion between frames, and thus the predicted image is generated using, as a reference image, an image shifted by the amount of motion.

A high compression rate can be achieved by coding the difference between the input image and the predicted image generated in the above manner and coding motion information (referred to as a motion vector). Such processing is known as motion compensated prediction.

Decoding or coding processing including the motion compensated prediction is performed on a picture partitioned into blocks each having a predetermined number of pixels (luminance components: 16×16 pixels). Such pixel blocks are called macroblocks. At the time of decoding, an image at a position indicated by a motion vector is obtained from a memory as a reference image on a macroblock-by-macroblock basis, so as to perform motion compensated prediction. Here, the data amount of one pixel is one byte.

As the MPEG coding methods, MPEG-2 (ISO/IEC 13818-2) and MPEG-4 (ISO/IEC 14496-2) are conventionally in use. In addition, recent years have seen increasing use of new coding methods such as H.264/MPEG-4 AVC (ISO/IEC 14496-10) (hereinafter simply referred to as "H.264") and VC-1 (SMPTE 421M).

The new coding methods which are represented particularly by H.264 achieve a compression rate that is double to quadruple the compression rate of the conventional MPEG-2, and are widely used in compressing high-definition images such as full HD (high definition) images (1920×1080 pixels).

Meanwhile, there is recently a development of displays for super high-definition images of 4K2K (4096×2048 pixels) that extend beyond the full HD images, and the need to handle such super high-definition images will be inevitable.

However, the 4K2K image data has a data amount about quadruple that of full HD image data, and decoding the 4K2K image data requires an operation capability and a memory bandwidth that are about quadruple those required for decoding the full HD image data. How such high operation capability and wide memory bandwidth can be achieved is the key to providing an image decoding device capable of handling the super high-definition images of 4K2K.

To achieve high operation capability, one would consider parallel processing using multiple existing image decoding devices capable of handling the full HD image data. However, the new coding methods represented by H.264 have enhanced the compression rate in coding a current macroblock, using correlations between the current macroblock and neighboring macroblocks.

FIG. 1 is a diagram for explaining a decoding method which enhances the compression rate by making use of correlations between a current macroblock and neighboring macroblocks in accordance with H.264.

As shown in FIG. 1, decoding a given macroblock P requires reference to processing results of four neighboring macroblocks, namely, a left macroblock A, an upper left macroblock D, an upper macroblock B, and an upper right macroblock C.

In other words, decoding the current macroblock requires decoding of such neighboring macroblocks in advance, and for this reason such dependency between the current block and the neighboring blocks has been a problem in parallel processing.

In view of the above, there is a conventional image decoding device which performs parallel decoding of image data while solving the dependency problem (see Patent Literature 1, for example).

FIG. 2 is a diagram for explaining a decoding method adopted by a conventional image decoding device.

Each of blocks shown in FIG. 2 represents a macroblock of a picture. The numbers assigned to the macroblocks indicate the so processing time; macroblocks having the same number are simultaneously decoded in parallel.

As shown in FIG. 2, the processing starts with the upper left macroblock of the picture. A given current macroblock is decoded in parallel with a macroblock located two columns to the left in one row below with respect to the current macroblock. This solves the problem of positional dependency.

CITATION LIST

Patent Literature

[PTL 1] Japanese Unexamined Patent Application Publication No. 2006-129284

SUMMARY OF INVENTION

Technical Problem

With the conventional image decoding device, however, the amount of data being transferred increases momentarily, causing an increase in the memory bandwidth required by the memory included in the image decoding device.

That means, when macroblocks to be decoded in parallel are macroblocks for which a large amount of data needs to be obtained from the memory, the conventional image decoding device momentarily transfers a large amount of data from the memory. As a result, it is necessary to use a memory which enables transfer of the large amount of data, causing an increase in the memory bandwidth required by the memory included in the image decoding device.

For this reason, in the case where the image decoding device shares the memory with another device and there is a momentary increase in the amount of data being transferred for the image decoding device, for example, the memory bandwidth available for the other device diminishes. As a consequence, the data transfer of the other device is hindered, causing a delay in the processing of the other device. As discussed above, the conventional image decoding device entails a memory bandwidth problem.

With a view to solve the above conventional problem, it is an object of the present invention to provide an image decoding device, an image decoding method, an integrated circuit, and a program which enable suppression of the momentary increase in the amount of data transferred and allow parallel decoding of the image data with a small memory bandwidth.

Solution to Problem

In order to achieve the above object, the image decoding device according to an aspect of the present invention is an image decoding device that decodes coded image data on a block-by-block basis, the coded image data being resulted from coding, on a block-by-block basis, of image data partitioned into blocks each of which has a predetermined number of pixels, the image decoding device including: a storage unit configured to store data of at least one reference image to be referred to for decoding the coded image data; a pre-decoding unit configured to decode, on a block-by-block basis, reference information indicating the number of reference images to be referred to on a block-by-block basis for decoding the coded image data; an amount-of-transferred-data prediction unit configured to calculate, on a block-by-block basis using the reference information, a predictive data amount of a reference image to be read out on a block-by-block basis from the storage unit for decoding the coded image data; a block determination unit configured to determine, using the predictive data amount calculated, multiple blocks in the coded image data which are to be decoded in parallel, in such a manner as to reduce variation in amounts of data read out from the storage unit; and block decoding units configured to decode in parallel the determined multiple blocks in the coded image data.

According to this, a predictive data amount of reference image(s) is calculated using the number of reference images. Based on this, multiple blocks in coded image data which are to be decoded in parallel are determined, and the determined multiple blocks are decoded in parallel. For example, when two reference images are required for decoding, the predictive data amount is twice the data amount when one reference image is required. That means, when image data coded with an MPEG coding method such as H.264 is to be decoded, for example, the amount of data to be obtained from the memory can be accurately predicted in advance and thus blocks to be decoded in parallel can be appropriately selected in such a manner as to reduce variation in the amounts of data read out from the storage unit. This enables suppression of the momentary increase in the amount of data transferred, allowing parallel decoding of the image data with a small memory bandwidth.

With this, in the case where the image decoding device shares the storage unit with another device and the amount of data transferred for the other device is large, for example, the amount of data to be transferred for the image decoding device can be decreased, so that the data transfer of the other device is not hindered, and the processing of the other device is not adversely affected. Further, the amount of data to be transferred for the image decoding device can be increased when the amount of data transferred for the other device is small, so that the image decoding device performs the image decoding process faster.

Preferably, the pre-decoding unit is configured to variable-length decode, as the reference information, macroblock type information provided for each of macroblocks that are the blocks, the macroblock type information being included in the coded image data, and the amount-of-transferred-data prediction unit is configured to calculate the predictive data amount by multiplying the number of reference images indicated in the macroblock type information by a data amount per reference image.

According to this, the macroblock type information is decoded as the reference information indicating the number of reference images. For example, the number of reference images required for decoding an I-macroblock is zero, the number of reference images required for decoding a P-macroblock is one, and the number of reference images required for decoding a B-macroblock is two. With this, it is possible to easily obtain the number of reference images, suppress the momentary increase in the amount of data transferred, and perform parallel decoding of the image data with a small memory bandwidth.

Preferably, in the case where the block decoding units decode the coded image data with reference to a reference image on a partition block-by-partition block basis, where partition blocks are resulted from partitioning of each block of the coded image data into smaller blocks, the pre-decoding unit is configured to further decode block partition type information indicating a size of the partition blocks, the block partition type information being included in the coded image data, and the amount-of-transferred-data prediction unit is configured to calculate the predictive data amount for each of the partition blocks having the size indicated in the block partition type information, further by weighting a data amount of a reference image located at an integer-pixel position and a data amount of a reference image located at a sub-pixel position, using a probability of reference to the reference image located at the integer-pixel position and a probability of reference to the reference image located at the sub-pixel position.

According to this, in the case of reference to reference image(s) on a partition block-by-partition block basis, the predictive data amount is calculated for each of the partition blocks further by weighting a data amount of a reference image located at an integer-pixel position and a data amount of a reference image located at a sub-pixel position. With this, the predictive data amount can be calculated using not only the data amount of the reference image located at the integer-pixel position but also the data amount of the reference image located at the sub-pixel position. As a result, the predicted data amount can be calculated more accurately, allowing appropriate selection of blocks to be decoded in parallel. Thus, even in the case of reference to reference image(s) on a partition block-by-partition block basis, it is possible to suppress the momentary increase in the amount of data transferred, allowing parallel decoding of the image data with a small memory bandwidth.

Preferably, the amount-of-transferred-data prediction unit is configured to calculate the predictive data amount on a partition block-by-partition block basis by assuming that: a first probability is a probability of reference to a first reference image whose horizontal and vertical positions are both integer-pixel positions; a second probability is a probability of reference to a second reference image whose horizontal position is a sub-pixel position and whose vertical position is an integer-pixel position; a third probability is a probability of reference to a third reference image whose horizontal position is an integer-pixel position and whose vertical position is a sub-pixel position; and a fourth probability is a probability of reference to a fourth reference image whose horizontal and vertical positions are both sub-pixel positions, and by multiplying data amounts of the first, second, third, and fourth reference images by the first, second, third, and fourth probabilities, respectively, and adding up the resulting products.

According to this, the predictive data amount is calculated using a probability of reference to a reference image whose horizontal or vertical position is an integer-pixel position or a sub-pixel position. With this, the predictive data amount can be calculated more accurately because it is calculated considering whether the horizontal or vertical position is an integer-pixel position or a sub-pixel position. This enables suppression of the momentary increase in the amount of data transferred, allowing parallel decoding of the image data with a small memory bandwidth.

The pre-decoding unit may be configured to further decode, on a block-by-block basis, motion information indicating an amount of motion between an image of a current block to be decoded and a reference image, and the amount-of-transferred-data prediction unit may be configured to calculate the predictive data amount on a block-by-block basis by further using the motion information.

According to this, the predictive data amount is calculated using the motion information. As a result, the predictive data amount can be calculated more accurately, allowing appropriate selection of blocks to be decoded in parallel. This enables suppression of the momentary increase in the amount of data transferred, allowing parallel decoding of the image data with a small memory bandwidth.

Preferably, the amount-of-transferred-data prediction unit is configured to determine whether or not the reference image indicated in the motion information is located at a sub-pixel position, and in the case of determining that the reference image is located at a sub-pixel position, calculate a data amount of the reference image located at the sub-pixel position as the predictive data amount.

According to this, when the reference image is located at a sub-pixel position, the data amount of the reference image located at the sub-pixel position is calculated as the predictive data amount. As a result, the predictive data amount can be calculated more accurately, allowing appropriate selection of blocks to be decoded in parallel. This enables suppression of the momentary increase in the amount of data transferred, allowing parallel decoding of the image data with a small memory bandwidth.

Preferably, the amount-of-transferred-data prediction unit is configured to determine whether or not an address of the reference image indicated in the motion information is an aligned address, and in the case of determining that the address of the reference image is not an aligned address, correct the address of the reference image to an aligned address to calculate the predictive data amount.

According to this, in the case where the address of the reference image is not an aligned address, the address of the reference image is corrected to an aligned address to calculate the predictive data amount. As a result, the predictive data amount can be calculated more accurately, allowing appropriate selection of blocks to be decoded in parallel. This enables suppression of the momentary increase in the amount of data transferred, allowing parallel decoding of the image data with a small memory bandwidth.

Preferably, the block determination unit is configured to determine, using the predictive data amount, multiple blocks in the coded image data which are to be decoded in parallel, by rearranging a decoding order of the blocks in the coded image data in such a manner as to reduce variation in the amounts of data read out from the storage unit.

According to this, multiple blocks to be decoded in parallel are determined by rearranging the block decoding order in such a manner as to reduce variation in the amounts of data read out from the storage unit. With this, the block decoding order can be rearranged such that the momentary increase in the amount of data transferred is prevented. As a result, it is possible to suppress the momentary increase in the amount of data transferred, allowing parallel decoding of the image data with a small memory bandwidth.

The block determination unit may be configured to determine, using the predictive data amount, multiple blocks in the coded image data which are to be decoded in parallel, by changing the number of blocks to be decoded in parallel in such a manner as to reduce variation in the amounts of data read out from the storage unit.

According to this, multiple blocks to be decoded in parallel are determined by changing the number of blocks to be decoded in parallel in such a manner as to reduce variation in the amounts of data read out from the storage unit. With this, the number of blocks can be changed such that the momentary increase in the amount of data transferred is prevented. As a result, it is possible to suppress the momentary increase in the amount of data transferred, allowing parallel decoding of the image data with a small memory bandwidth.

Preferably, the block determination unit is configured to determine multiple blocks in the coded image data which are to be decoded in parallel such that an average of predictive data amounts calculated for the multiple blocks to be decoded in parallel approaches an average of predictive data amounts calculated for a predetermined number of blocks.

According to this, multiple blocks to be decoded in parallel are determined such that the average of the predictive data amounts calculated for the multiple blocks approaches the average of the predictive data amounts calculated for the predetermined number of blocks. With this, a sum of predictive data amounts calculated for the blocks to be decoded in parallel becomes an average value. As a result, it is possible to suppress the momentary increase in the amount of data transferred, allowing parallel decoding of the image data with a small memory bandwidth.

Preferably, the block determination unit is configured to determine multiple blocks in the coded image data which are to be decoded in parallel such that a sum of predictive data amounts calculated for the multiple blocks to be decoded in parallel approaches a differential data amount, the differential data amount being a data amount obtained by subtracting an amount of data transferred for another device from a maximum amount of data transferable from the storage unit. The block determination unit is configured to determine multiple blocks in the coded image data which are to be decoded in parallel such that the sum of predictive data amounts calculated for the multiple blocks to be decoded in parallel increases when the differential data amount is larger. Further, the block determination unit is configured to determine multiple blocks in the coded image data which are to be decoded in parallel such that the sum of predictive data amounts calculated for the multiple blocks to be decoded in parallel decreases when the differential data amount is smaller.

According to this, multiple blocks to be decoded in parallel are determined such that the sum of predictive data amounts calculated for the multiple blocks to be decoded in parallel approaches the differential data amount. More specifically, multiple blocks to be decoded in parallel are determined such that: the sum of predictive data amounts calculated for the multiple blocks to be decoded in parallel increases when the differential data amount is larger; and the sum of predictive data amounts calculated for the multiple blocks to be decoded in parallel decreases when the differential data amount is smaller. This enables parallel decoding of the image data with a preset memory bandwidth.

It is to be noted that the present invention can be realized not only as the image decoding device described above, but also as an integrated circuit including processing units of the image decoding device, and as a method including, as steps, processing performed by such processing units. In addition, the present invention can be realized also as: a program which causes a computer to execute such steps; a computer-readable recording medium such as a CD-ROM on which such a program is recorded; and information, data or a signal indicating such a program. Such a program, information, data, and signal may be distributed via a communication network such as the Internet.

Advantageous Effects of Invention

With the image decoding device according to an aspect of the present invention, it is possible to suppress the momentary increase in the amount of data transferred and allow parallel decoding of the image data with a small memory bandwidth. As a result, in the case where the image decoding device shares the memory with another device and there is a large amount of data transferred for the other device, for example, the amount of data to be transferred for the image decoding device is decreased, so that the data transfer of the other device is not hindered and the processing of the other device is not adversely affected. Furthermore, the amount of data to be transferred for the image decoding device is increased when the amount of data transferred for the other device is small, so that the image decoding device can perform the image decoding process faster.

BRIEF DESCRIPTION OF DRAWINGS

FIG. 8 is a table showing macroblock types and macroblock partition types for P-slices.

FIG. 9 is a table showing macroblock types and macroblock partition types for B-slices.

FIG. 15 is a table showing sub-macroblock types and sub-macroblock partition types for P-macroblocks.

FIG. 16 is a table showing sub-macroblock types and sub-macroblock partition types for B-macroblocks.

FIG. 17 is a diagram showing how to calculate pixel values of a reference image which is located at a sub-pixel position according to H.264 motion compensated prediction in Embodiment 2.

FIG. 18 is a table showing a relationship between a unit block of H.264 motion compensated prediction and a predictive data amount according to Embodiment 2.

DESCRIPTION OF EMBODIMENTS

With reference to the drawings, the following describes embodiments of the present invention applied to an image decoding device compliant with an H.264 coding method. Although the embodiments show an image decoding device compliant with an H.264 coding method, any image decoding devices can be implemented in a similar manner as long as they are compliant with a video coding method involving motion compensation.

Embodiment 1

Figure 3:
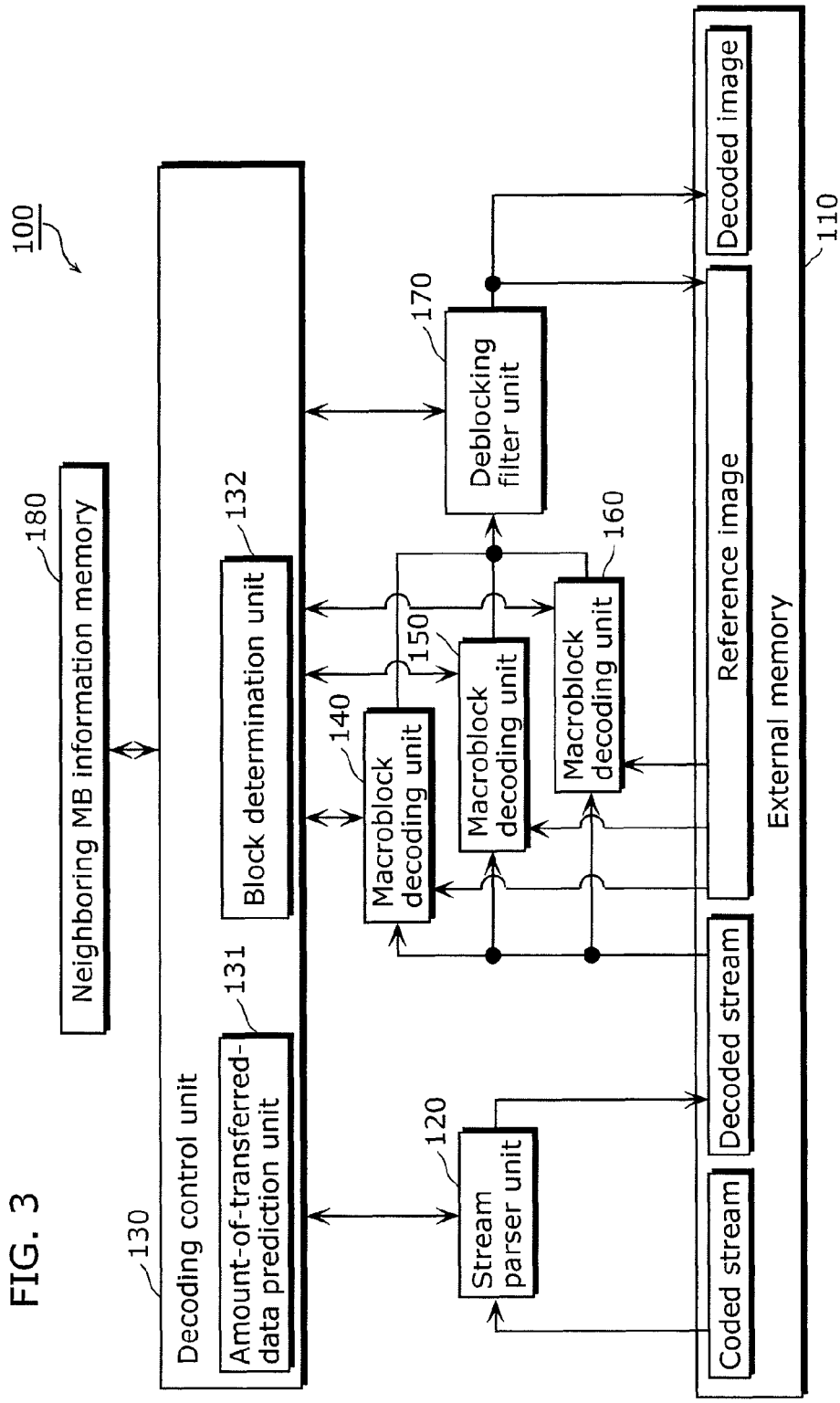
FIG. 3 is a block diagram showing a functional structure of an image decoding device according to Embodiment 1.

FIG. 3 is a block diagram showing a functional structure of an image decoding device 100 according to Embodiment 1 of the present invention.

The image decoding device 100 is a device that decodes, on a block-by-block basis, coded image data which is resulted from coding, on a block-by-block basis, of image data partitioned into blocks each of which has a predetermined number of pixels. Here, the blocks each having a predetermined number of pixels are macroblocks.

As shown in FIG. 3, the image decoding device 100 includes an external memory 110, a stream parser unit 120, a decoding control unit 130, a macroblock decoding unit 140, a macroblock decoding unit 150, a macroblock decoding unit 160, a deblocking filter unit 170, and a neighboring MB information memory 180.

In the neighboring MB information memory 180, information about neighboring macroblock(s) necessary for decoding a macroblock is stored.

In the external memory 110, at least one coded stream, at least one decoded stream, at least one reference image, and at least one decoded image are stored. The coded stream is coded image data which is provided. The decoded stream is coded image data that has been variable-length decoded by the stream parser unit 120. The reference image is an image referred to for decoding the coded image data. The decoded image is an image resulted from decoding of the coded image data.

The external memory 110 is equivalent to the "storage unit" in the claims.

The external memory 110 may be shared with another device different from the image decoding device 100 of the present embodiment. In such a case, data other than the coded stream, the decoded stream, the reference image, and the decoded image is also stored in the external memory 110.

The stream parser unit 120 variable-length decodes the coded stream to generate a decoded stream, and sends the decoding control unit 130 a parameter necessary for predicting a data amount of the reference image(s) which is to be obtained from the external memory 110 for decoding a macroblock.

More specifically, the stream parser unit 120 reads out from the external memory 110 the coded stream which has been coded by H.264, variable-length decodes the coded stream, and writes the resulting decoded stream to the external memory 110. Here, according to Embodiment 1, among parameters obtained through the variable-length decoding, at least reference information, which indicates the number of reference images to be referred to on a macroblock-by-macroblock basis for decoding the coded image data, is sent to the decoding control unit 130. The reference information is macroblock type information of macroblocks included in the coded image data.

The stream parser unit 120 is equivalent to the "pre-decoding unit" in the claims.

According to an instruction from the decoding control unit 130, the macroblock decoding units 140, 150, and 160 read out a decoded stream from the external memory 110, decode macroblocks in parallel, and output reconstructed pixel data to the deblocking filter unit 170. Here, as necessary, the macroblock decoding units 140, 150, and 160 read out from the external memory 110 pixel data of reference image(s) which is to be used in motion compensated prediction.

Each of the macroblock decoding units 140, 150, and 160 is equivalent to the "block decoding unit" in the claims.

The deblocking filter unit 170 applies a deblocking filter to the reconstructed pixel data to remove a block noise, and outputs the resulting decoded image to the external memory 110. Here, the decoded image to be used as a reference image in the subsequent decoding process is stored also as a reference image in the external memory.

The decoding control unit 130 issues a processing start instruction to the stream parser unit 120, the macroblock decoding units 140, 150, and 160, and the deblocking filter unit 170 to control the image decoding processing as a whole.

Further, the decoding control unit 130 includes an amount-of-transferred-data prediction unit 131 and a block determination unit 132.

Using the macroblock type information, the amount-of-transferred-data prediction unit 131 calculates, on a macroblock-by-macroblock basis, a predictive data amount of the reference image(s) to be read out on a macroblock-by-macroblock basis from the external memory 110 for decoding the coded image data. Specifically, using the parameter provided by the stream parser unit 120, the amount-of-transferred-data prediction unit 131 predicts, on a macroblock-by-macroblock basis, a data amount of the reference image(s) that needs to be obtained from the external memory 110 for the motion compensated prediction involved in the macroblock decoding processing.

To be more specific, the amount-of-transferred-data prediction unit 131 calculates a predictive data amount by multiplying the number of reference images indicated in the macroblock type information by the data amount per reference image.

Using the predictive data amount calculated by the amount-of-transferred-data prediction unit 131, the block determination unit 132 determines multiple macroblocks to be decoded in parallel in such a manner as to reduce variation in the amounts of data read out from the external memory 110. More specifically, the block determination unit 132 determines a macroblock decoding order in advance based on the predictive data amount such that the data amount of the reference image(s) to be obtained from the external memory 110 does not momentarily increase at the time of decoding macroblocks.

According to the decoding order determined in advance, the decoding control unit 130 controls the macroblock decoding processing of the macroblock decoding units 140, 150, and 160. When issuing a decoding start instruction to the macroblock decoding units 140, 150, and 160, the decoding control unit 130 reads out from the neighboring MB information memory 180 information about neighboring macroblocks which are necessary for decoding current macroblocks to be decoded, and passes the information to the macroblock decoding units 140, 150, and 160.

The macroblock decoding units 140, 150, and 160 decode in parallel multiple macroblocks determined by the block determination unit 132. When the macroblock decoding is finished, the macroblock decoding units 140, 150, and 160 provide the decoding control unit 130 with, as neighboring macroblock information, decoded macroblock information which is necessary for the subsequent decoding. The decoding control unit 130 stores such provided information in the neighboring MB information memory 180.

Next, the structures of the macroblock decoding units 140, 150, and 160 are described in detail. The structures of the macroblock decoding units 140, 150, and 160 are the same, and thus the following describes the structure of the macroblock decoding unit 140.

Figure 4:
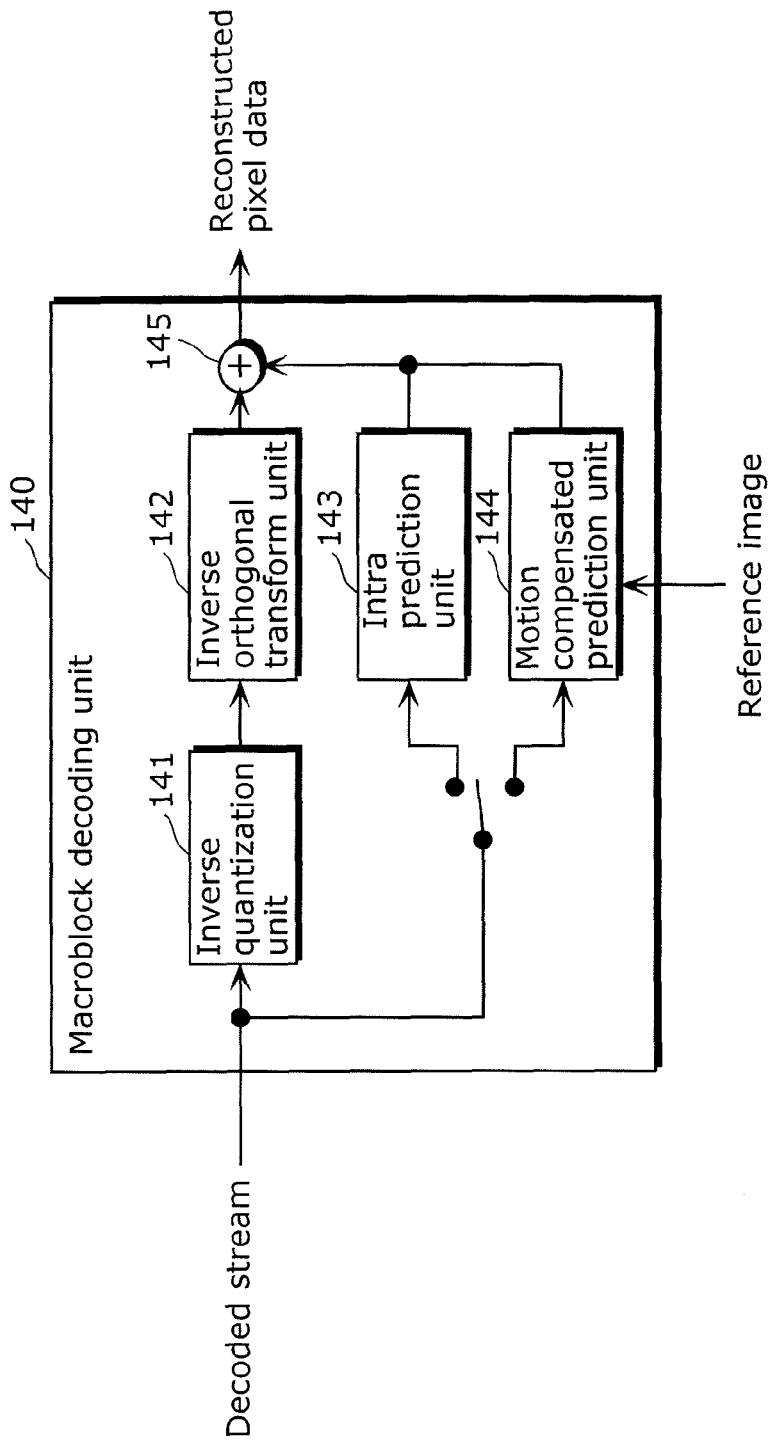
FIG. 4 is a block diagram showing a functional structure of a macroblock decoding unit according to Embodiment 1.

FIG. 4 is a block diagram showing a functional structure of the macroblock decoding unit 140 according to Embodiment 1.

As shown in FIG. 4, the macroblock decoding unit 140 includes an inverse quantization unit 141, an inverse orthogonal transform unit 142, an intra prediction unit 143, a motion compensated prediction unit 144, and an adder circuit 145.

The inverse quantization unit 141 gets quantized coefficient data from the decoded stream read out from the external memory 110, performs inverse quantization on the coefficient data, and outputs the resulting coefficient data to the inverse orthogonal transform unit 142.

The inverse orthogonal transform unit 142 performs inverse orthogonal transform on the coefficient data to generate spatial pixel data.

Depending on a prediction mode read out from the decoded stream, one of the intra prediction unit 143 and the motion compensated prediction unit 144 is activated to generate pixel data of a predicted image.

When the prediction mode is intra prediction, the intra prediction unit 143 is activated to perform intra prediction for generating pixel data of a predicted image.

When the prediction mode is inter prediction, the motion compensated prediction unit 144 is activated to obtain pixel data of a reference image according to a decoded motion vector and to perform inter prediction for generating pixel data of a predicted image.

The intra prediction unit 143 and the motion compensated prediction unit 144 perform the intra prediction and the motion compensated prediction, respectively, using the information about neighboring macroblocks provided by the decoding control unit 130.

The adder circuit 145 adds up the pixel data provided by the inverse orthogonal transform unit 142 and the pixel data of the predicted image provided by either the intra prediction unit 143 or the motion compensated prediction unit 144, so as to output reconstructed pixel data.

Next, a structure of a typical H.264 coded stream is described.

Figure 5:
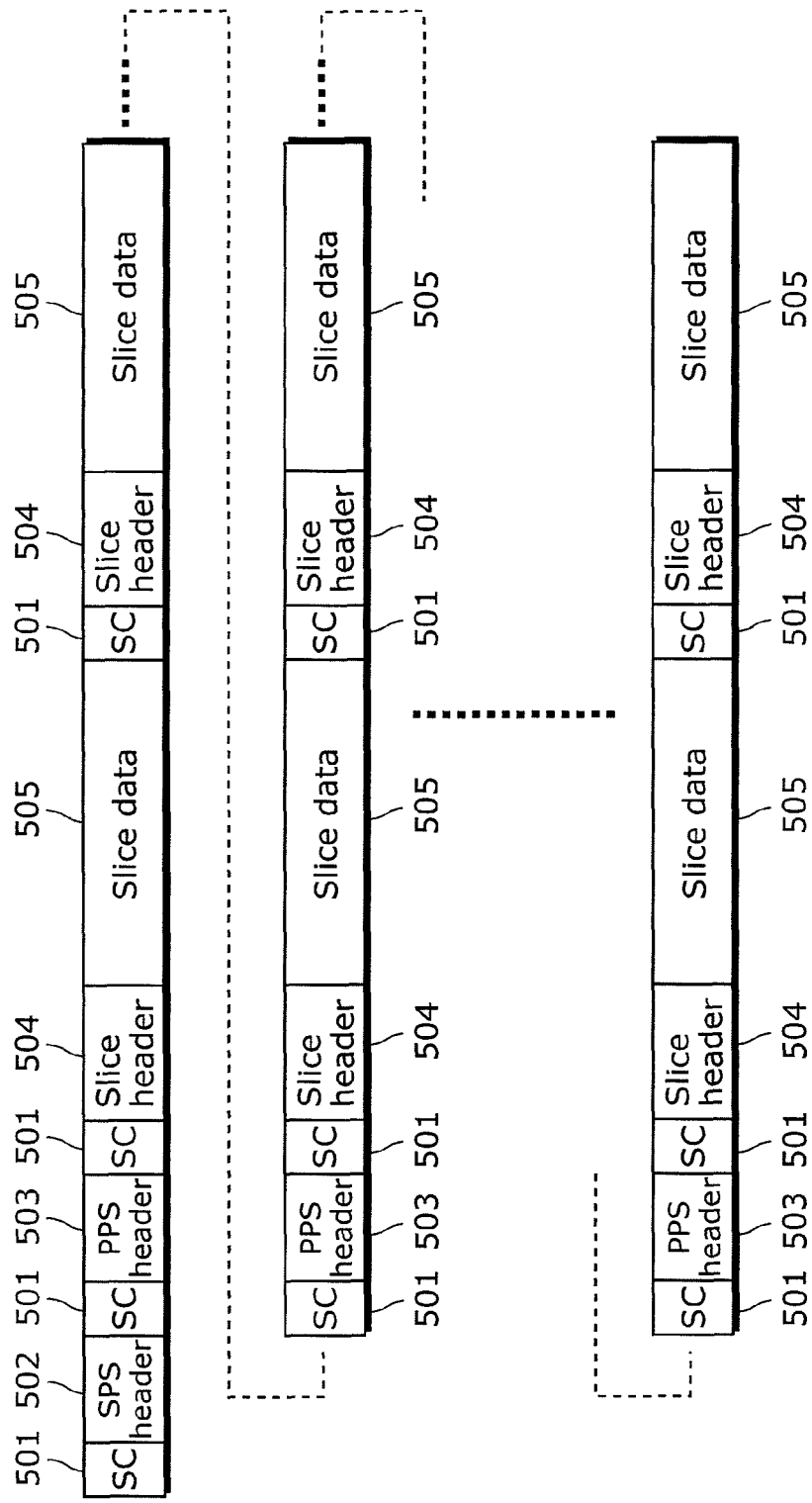
FIG. 5 is a diagram showing a structure of a typical H.264 coded stream.

FIG. 5 is a diagram showing a structure of a typical H.264 coded stream.

As shown in FIG. 5, the head of the coded stream is an SPS (Sequence Parameter Set) header 502, which is followed by a PPS (Picture Parameter Set) header 503, a slice header 504, and slice data 505.

The head of each of the SPS header 502, the PPS header 503, and the slice header 504 is a start code (SC) 501 indicating a data break. Thus, the SPS header 502, the PPS header 503, and the slice header 504 are searched out from the coded stream by searching out a start code 501 from the coded stream and analyzing data following the start code.

The PPS header 503 is at the head of a picture, and a series of data up to the next PPS header 503 is data of one picture. The data of one picture includes sets of the slice header 504 and the slice data 505, and the number of such sets equals the number of slices included in the picture.

Next, an operation of the image decoding device 100 is described in detail.

Figure 6:
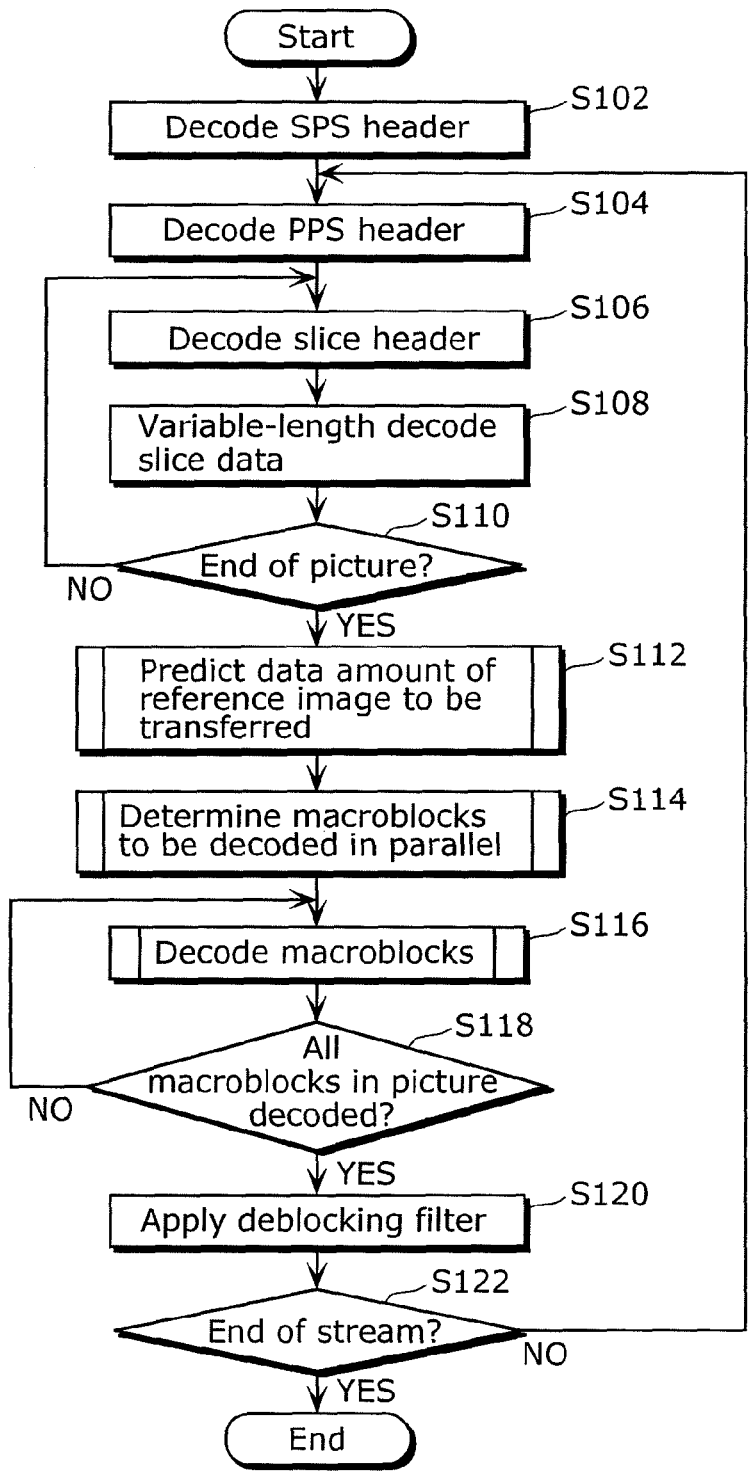
FIG. 6 is a flowchart showing an example of an operation of an image decoding device according to Embodiment 1.

FIG. 6 is a flowchart showing an example of an operation of the image decoding device 100 according to Embodiment 1 of the present invention.

First, the stream parser unit 120 reads out a coded stream from the external memory 110, and sequentially decodes an SPS header 502 (S102), a PPS header 503 (S104), and a slice header 504 (S106).

Then, when the decoding of the slice header 504 (S106) is completed, the stream parser unit 120 only variable-length decodes macroblocks included in slice data, so as to generate a decoded stream (S108).

Here, the decoded stream generated by the stream parser unit 120 includes an MB (macroblock) start code at the head of each macroblock so that the head of each macroblock can be identified when macroblocks are to be decoded in parallel in subsequent processing. In the present embodiment, the MB start code is set to 0x000001F0. The MB start code, however, may be any value as long as it is a unique value different from the other codes.

Further, the stream parser unit 120 not only generates the decoded stream but also sends the decoding control unit 130 parameters mb_type (macroblock type), sub_mb_type (sub-macroblock type), ref_idx (reference index), and a parameter such as mvd (motion vector difference) which is necessary for calculating a motion vector, among decoded parameters.

In Embodiment 1, the stream parser unit 120 sends the decoding control unit 130 at least mb_type among the decoded parameters. The parameter mb_type is included in the "macroblock type information" in the claims.

When the variable-length decoding of one slice is completed, the stream parser unit 120 determines whether or not the decoded slice is the end of the picture (S110). The number of slices included in the picture can be identified by decoding num_slice_groups_minus1 which is included in the PPS header 503. Thus, it is determined that the decoded slice is the end of the picture if the number of decoded slices minus 1 is equal to num_slice_groups_minus1.

In the case of determining that the decoded slice is not the end of the picture (NO in S110), the stream parser unit 120 sequentially performs decoding of a slice header 504 (S106) and variable-length decoding of slice data 505 (S108) until the end of the picture is reached.

Then, when the stream parser unit 120 determines that the decoded slice is the end of the picture (YES in S110), the amount-of-transferred-data prediction unit 131 of the decoding control unit 130 calculates, on a macroblock-by-macroblock basis, a predictive data amount of reference image(s) that needs to be obtained from the external memory 110 for the motion compensated prediction involved in the macroblock decoding processing (S112). The details of the calculation of the predictive data amount performed by the amount-of-transferred-data prediction unit 131 are described later.

When the amount-of-transferred-data prediction unit 131 finishes predicting, for one picture on a macroblock-by-macroblock basis, the data amount of the reference image(s) to be transferred, the block determination unit 132 determines multiple macroblocks to be decoded in parallel, based on the predicted value (S114). More specifically, the block determination unit 132 determines a macroblock decoding order. The details of the determination of macroblocks to be decoded in parallel, performed by the block determination unit 132, are described later.

When the block determination unit 132 determines a decoding order of macroblocks included in one picture, the macroblock decoding units 140, 150, and 160 read a decoded stream from the external memory 110 and decode in parallel the macroblocks to be decoded, according to an instruction from the decoding control unit 130 (S116). The details of the macroblock decoding performed by the macroblock decoding units 140, 150, and 160 are described later.

According to the decoding order determined by the block determination unit 132, the decoding control unit 130 issues, on a macroblock-by-macroblock basis, an instruction to the macroblock decoding units 140, 150, and 160 to start decoding.

When the macroblock decoding units 140, 150, and 160 complete the decoding of the current macroblocks to be decoded, the decoding control unit 130 determines whether or not all of the macroblocks in the picture have been decoded (S118).

Then, when the decoding control unit 130 determines that all of the macroblocks in the picture have not yet been decoded (NO in S118), the macroblock decoding units 140, 150, and 160 decode macroblocks (S116) until all of the macroblocks in the picture are decoded.

When the decoding control unit 130 determines that all of the macroblocks in the picture have been decoded (YES in S118), the deblocking filter unit 170 performs a deblocking filter to reconstructed pixel data of one picture (S120).

When the deblocking filter unit 170 completes the deblocking filter, the decoding control unit 130 then determines whether or not the deblocking-filtered picture is the end of the stream (S122).

If the stream is still continuing, the decoding control unit 130 determines that the current picture is not the end of the stream (NO in S122), and the stream parser unit 120 decodes a PPS header 503 again (S104) to continuously decode the coded stream.

When the decoding control unit 130 determines that the current picture is the end of the stream (YES in S122), the processing ends.

With this, the image decoding device 100 finishes the decoding of the coded stream.

Next, the following describes the details of the calculation of the predictive data amount performed by the amount-of-transferred-data prediction unit 131 (S112 in FIG. 6).

In the present embodiment, the amount-of-transferred-data prediction unit 131 calculates the predictive data amount using a prediction method which is based on a macroblock type identified by mb_type included in the macroblock layer.

Figure 7:
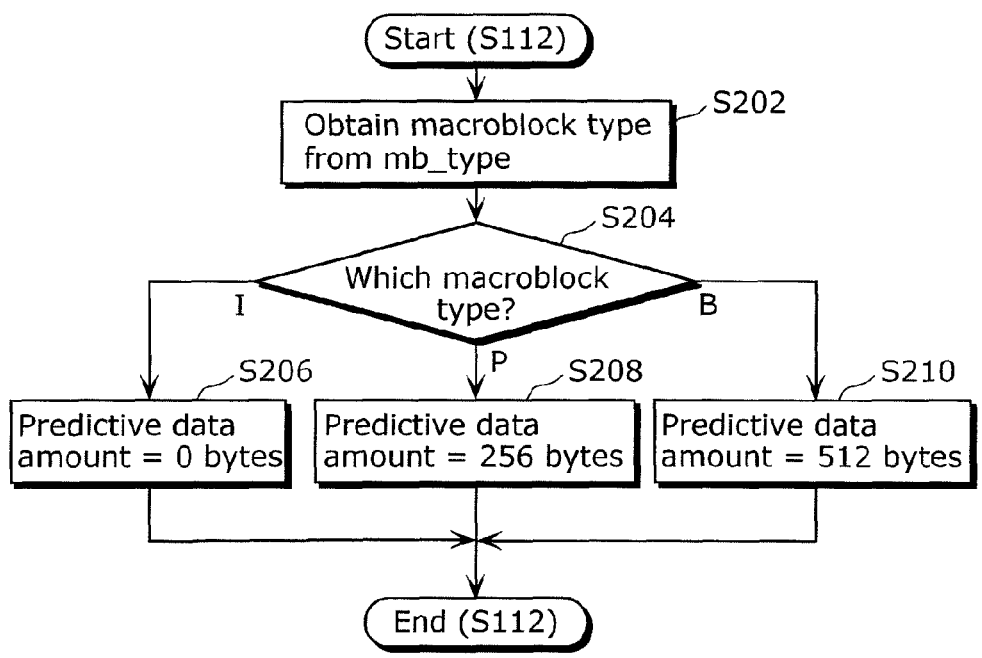
FIG. 7 is a flowchart showing an example of calculation of a predictive data amount, performed by an amount-of-transferred-data prediction unit according to Embodiment 1.

FIG. 7 is a flowchart showing an example of the calculation of the predictive data amount performed by the amount-of-transferred-data prediction unit 131 according to Embodiment 1. Although FIG. 7 shows the calculation of the predictive data amount for one macroblock, the amount-of-transferred-data prediction unit 131 performs such calculation shown in FIG. 7 for all the macroblocks included in the picture.

As shown in FIG. 7, the amount-of-transferred-data prediction unit 131 first obtains a macroblock type of a current macroblock to be decoded, from mb_type decoded by the stream parser unit 120 (S202). It is to be noted that mb_type is a parameter obtained when the stream parser unit 120 variable-length decodes the coded stream, and is sent from the stream parser unit 120 to the decoding control unit 130 in advance.

Here, there are three macroblock types, namely, a macroblock type I, a macroblock type P, and a macroblock type B. The following describes which one of the three macroblock types is obtained by the amount-of-transferred-data prediction unit 131 from mb_type.

FIG. 8 is a table showing macroblock types and macroblock partition types for P-slices.

FIG. 9 is a table showing macroblock types and macroblock partition types for B-slices.

The slice type of a current slice (an I-slice, a P-slice, or a B-slice) is identified from slice_type included in the slice header 504, which has been decoded by the stream parser unit 120, of the current slice which includes the current macroblock to be decoded.

As shown in FIG. 8, a P-slice includes P-macroblocks and I-macroblocks. To be more specific, a macroblock whose mb_type is "0 to 4" is a P-macroblock, and a macroblock whose mb_type is "5 to 25" is an I-macroblock.

Thus, the amount-of-transferred-data prediction unit 131 obtains the macroblock type P when mb_type of a macroblock of a P-slice is "0 to 4", and obtains the macroblock type I when mb_type of the macroblock is "5 to 25".

Further, as shown in FIG. 9, a B-slice includes B-macroblocks and I-macroblocks. To be more specific, a macroblock whose mb_type is "0 to 22" is a B-macroblock, and a macroblock whose mb_type is "23 to 25" is an I-macroblock.

Thus, the amount-of-transferred-data prediction unit 131 obtains the macroblock type B when mb_type of a macroblock of a B-slice is "0 to 22", and obtains the macroblock type I when mb_type of the macroblock is "23 to 25".

Furthermore, an I-slice includes I-macroblocks only. Thus, the amount-of-transferred-data prediction unit 131 obtains the macroblock type I for macroblocks of an I-slice.

Referring back to FIG. 7, the amount-of-transferred-data prediction unit 131 determines what is the obtained macroblock type (S204).

In the case of determining that the obtained macroblock type is the macroblock type I ("I" in S204), the amount-of-transferred-data prediction unit 131 calculates the predictive data amount as 0 bytes (S206).

That is to say, as for an I-macroblock, a predicted image is generated not through motion compensated prediction but through intra prediction, which means that no reference image data is necessary.

In the case of determining that the obtained macroblock type is the macroblock type P ("P" in S204), the amount-of-transferred-data prediction unit 131 calculates the predictive data amount as 256 bytes (S208).

That is to say, as for a P-macroblock, motion compensated prediction is performed using a temporally close frame as a reference image, which means that reference image data of one macroblock, that is, reference image data of 256 bytes (16 pixels×16 pixels×1), is necessary.

In the case of determining that the obtained macroblock type is the macroblock type B ("B" in S204), the amount-of-transferred-data prediction unit 131 calculates the predictive data amount as 512 bytes (S210).

That is to say, as for a B-macroblock, motion compensated prediction is performed using two temporally close frames as reference images, which means that reference image data of two macroblocks, that is, reference image data of 512 bytes (16 pixels×16 pixels×2), is necessary.

In such a manner, it is possible to calculate, based on the macroblock type, the predictive data amount of the reference image(s) necessary for the motion compensated prediction.

Specifically, with the prediction method based on the macroblock type according to the present embodiment, the predictive data amount is assumed as the predictive data amount of the reference image(s) to be obtained from the external memory 110.

With this, the amount-of-transferred-data prediction unit 131 according to Embodiment 1 finishes the calculation of the predictive data amount (S112 in FIG. 6).

Next, the following describes the details of the determination of macroblocks to be decoded in parallel, performed by the block determination unit 132 (S114 in FIG. 6).

In the present embodiment, the block determination unit 132 determines multiple macroblocks to be decoded in parallel, by rearranging the macroblock decoding order in such a way that the average of predictive data amounts calculated for the multiple macroblocks to be decoded in parallel approaches the average of predictive data amounts calculated for a predetermined number of macroblocks.

Figure 10:
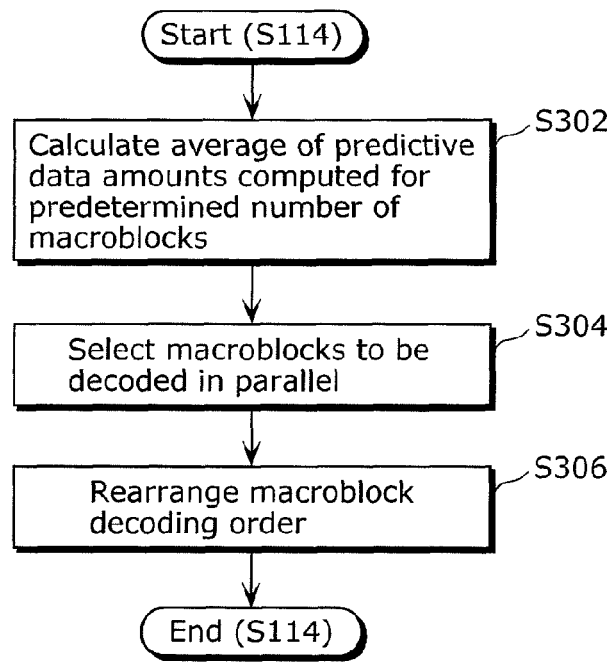
FIG. 10 is a flowchart showing an example of determination of macroblocks to be decoded in parallel, performed by a block determination unit according to Embodiment 1.

FIG. 10 is a flowchart showing an example of the determination of macroblocks to be decoded in parallel, performed by the block determination unit 132 according to Embodiment 1.

First, the block determination unit 132 calculates the average of predictive data amounts computed for a predetermined number of macroblocks (S302). Here, the predetermined number of macroblocks may be all the macroblocks included in the picture or macroblocks whose decoding order has already been determined by the block determination unit 132.

Then, the block determination unit 132 selects multiple macroblocks to be decoded in parallel such that the average of predictive data amounts calculated for the multiple macroblocks to be decoded in parallel approaches the average of predictive data amounts calculated for the predetermined number of macroblocks (S304). Here, the predetermined number of macroblocks is assumed as all the macroblocks included in the picture.

The following describes in detail the calculation of the average of predictive data amounts (S302) and the selection of the macroblocks to be decoded in parallel (S304), which are performed by the block determination unit 132.

Figure 1:
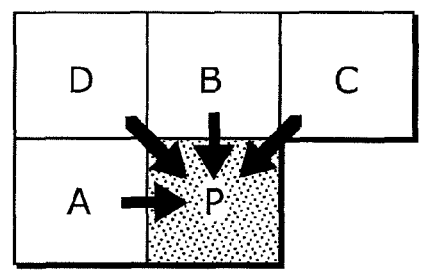
FIG. 1 is a diagram for explaining a decoding method which enhances the compression rate by making use of correlations between a current macroblock and neighboring macroblocks in accordance with H.264.
Figure 2:
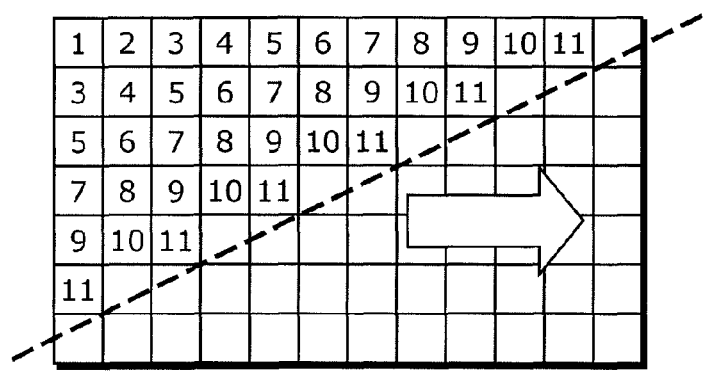
FIG. 2 is a diagram for explaining a decoding method adopted by a conventional image decoding device.

The macroblock decoding order is as shown in FIG. 2; basically, macroblocks are decoded in ascending order of the number assigned. However, since there are only three macroblock decoding units in the present embodiment, macroblocks having the same number cannot be decoded at the same time in the case where there are more than three macroblocks which can be decoded in parallel.

For example, although there are six macroblocks having the number 11, they need to be decoded in two batches because the number of macroblock decoding units is three. The predictive data amount of the reference image(s) is used for determining which macroblocks should be decoded first and which macroblocks should be decoded later.

In other words, the block determination unit 132 selects macroblocks to be decoded in parallel such that the average of predictive data amounts of the reference images of the macroblocks to be decoded in parallel becomes as close as possible to the average of predictive data amounts calculated for all the macroblocks. The block determination unit 132 performs such selection by obtaining all the possible combinations of macroblocks to be decoded in parallel, calculating the average of predictive data amounts of reference images for each combination, and then selecting a combination whose average of predictive data amounts is closest to the overall average.

Then, the block determination unit 132 rearranges the macroblock decoding order such that the selected macroblocks can be decoded in parallel (S306).

This prevents the momentary increase in the amount of data transferred from the external memory 110, and enables parallel decoding of image data which has been coded by H.264, with a small memory bandwidth.

It is to be noted that the transfer of reference images for use in the motion compensated prediction is not the only data transfer necessary for decoding H.264 coded images. However, the transfer of reference images accounts for the majority of the amount of data transferred for decoding, and thus suppression of the momentary increase in the amount of data transferred for obtaining reference images enables suppression of an increase in the memory bandwidth of the external memory 110.

With this, the block determination unit 132 finishes the determination of macroblocks to be decoded in parallel (S114 in FIG. 6).

Next, the following describes the details of the macroblock decoding performed by each of the macroblock decoding units 140, 150, and 160 (S116 in FIG. 6).

Figure 11:
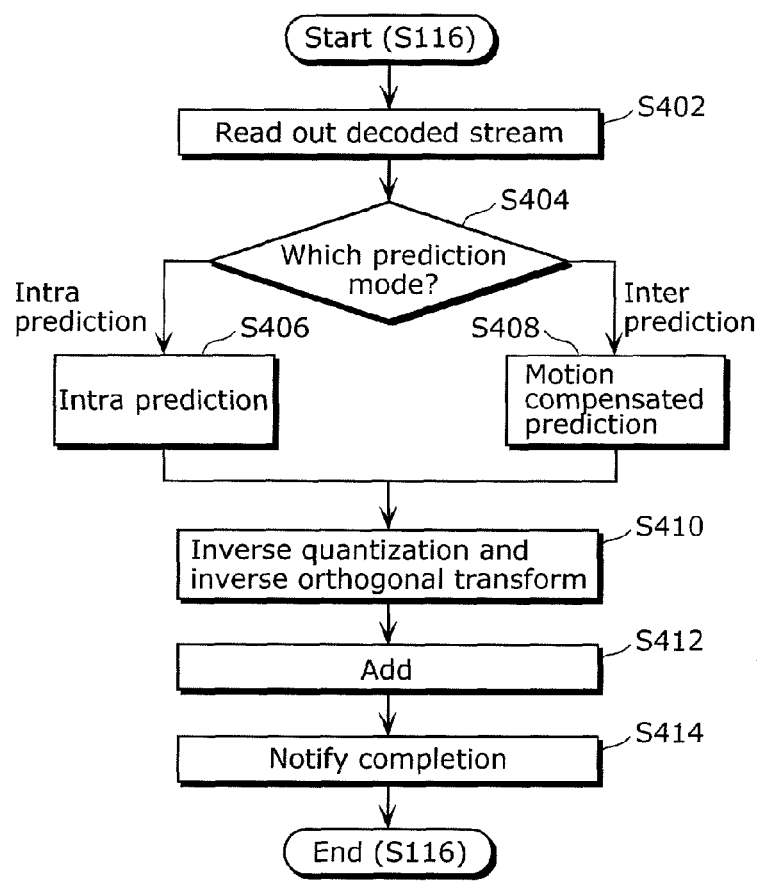
FIG. 11 is a flowchart showing an example of macroblock decoding performed by a macroblock decoding unit according to Embodiment 1.

FIG. 11 is a flowchart showing an example of the macroblock decoding performed by the macroblock decoding unit 140 according to Embodiment 1. It is to be noted that a description of the macroblock decoding performed by the macroblock decoding units 150 and 160 is omitted because it is the same as the macroblock decoding performed by the macroblock decoding unit 140.

First, as shown in FIG. 11, upon receiving an instruction from the decoding control unit 130 to start decoding macroblocks, the macroblock decoding unit 140 reads out from the external memory 110 a decoded stream which includes a macroblock to be decoded (S402).

Next, the macroblock decoding unit 140 reads out a prediction mode from the decoded stream and determines whether the prediction mode is intra prediction or inter prediction (S404).

In the case where the macroblock decoding unit 140 determines that the prediction mode is intra prediction ("intra prediction" in S404), the intra prediction unit 143 is activated to perform intra prediction and generate pixel data of a target block (S406).

In the case where the macroblock decoding unit 140 determines that the prediction mode is inter prediction ("inter prediction" in S404), the motion compensated prediction unit 144 is activated to perform motion compensated prediction and generate pixel data of a target block (S408).

Next, the macroblock decoding unit 140 reads out prediction error data from the decoded stream, the inverse quantization unit 141 performs inverse quantization on the prediction error data, and the inverse orthogonal transform unit 142 performs inverse orthogonal transform on the inverse-quantized prediction error data, so that prediction error pixel data is generated for the target block (S410).

Lastly, the macroblock decoding unit 140 adds up, using the adder circuit 145, the pixel data of the target block and the prediction error pixel data to obtain reconstructed pixel data (S412).

When decoding of one macroblock is completed, the macroblock decoding unit 140 notifies the decoding control unit 130 of the completion of the macroblock decoding (S414). Also, the macroblock decoding unit 140 provides the decoding control unit 130 with decoded macroblock information which is to be used as neighboring macroblock information in subsequent decoding processing.

With this, each of the macroblock decoding units 140, 150, and 160 finishes the macroblock decoding (S116 in FIG. 6).

As described above, the image decoding device 100 according to the present embodiment calculates the predictive data amount of reference image(s) using the number of reference images, determines multiple blocks in coded image data which are to be decoded in parallel, and decodes the determined blocks in parallel. That is to say, the amount of data to be obtained from the memory can be accurately calculated in advance when parallel decoding is to be performed on coded image data, and thus it is possible to appropriately select blocks to be decoded in parallel in such a manner as to reduce variation in the amounts of data read out from the external memory 110.

Further, the macroblock type information is decoded as the reference information indicating the number of reference images. This enables easy obtainment of the number of reference images.

Furthermore, the multiple blocks to be decoded in parallel are determined through rearrangement of the block decoding order. With this, the block decoding order can be rearranged such that the amount of data transferred does not increase momentarily. In the case where the coded image data being handled here is the coded image data which can bring about the greatest effect of this method, the memory bandwidth of the external memory 110 can be reduced by almost half, at maximum.

Furthermore, the multiple blocks to be decoded in parallel are determined such that the average of predictive data amounts calculated for the multiple blocks approaches the average of predictive data amounts calculated for the predetermined number of blocks. With this, the sum of the predictive data amounts calculated for the blocks to be decoded in parallel becomes an average value.

This enables suppression of the momentary increase in the amount of data transferred, allowing parallel decoding of the image data with a small memory bandwidth.

Embodiment 2

In Embodiment 2, the stream parser unit 120 further sends the decoding control unit 130 block partition type information which is included in the coded image data and indicates the size of partition blocks, in the case where decoding of the coded image data involves reference to reference image(s) on a partition block-by-partition block basis, where partition blocks are resulted from partitioning of each macroblock of the coded image data into smaller blocks.

Then, the amount-of-transferred-data prediction unit 131 calculates the predictive data amount for each partition block whose size is indicated in the block partition type information, further by weighting a data amount of a reference image located at an integer-pixel position and a data amount of a reference image located at a sub-pixel position, using a probability of reference to the reference image located at the integer-pixel position and a probability of reference to the reference image located at the sub-pixel position.

The block partition type information includes macroblock partition types that are types of macroblock partitioning and sub-macroblock partition types that are types of sub-macroblock partitioning. In other words, in Embodiment 2, the stream parser unit 120 sends the decoding control unit 130 at least mb_type and sub_mb_type among the decoded parameters. The details are described later.

Here, the processing of Embodiment 2 is the same as that of Embodiment 1 except for the calculation of the predictive data amount that is shown in FIG. 6 and performed by the amount-of-transferred-data prediction unit 131 (S112 in FIG. 6). Thus, the following describes the details of such different processing (S112 in FIG. 6).

Figure 12:
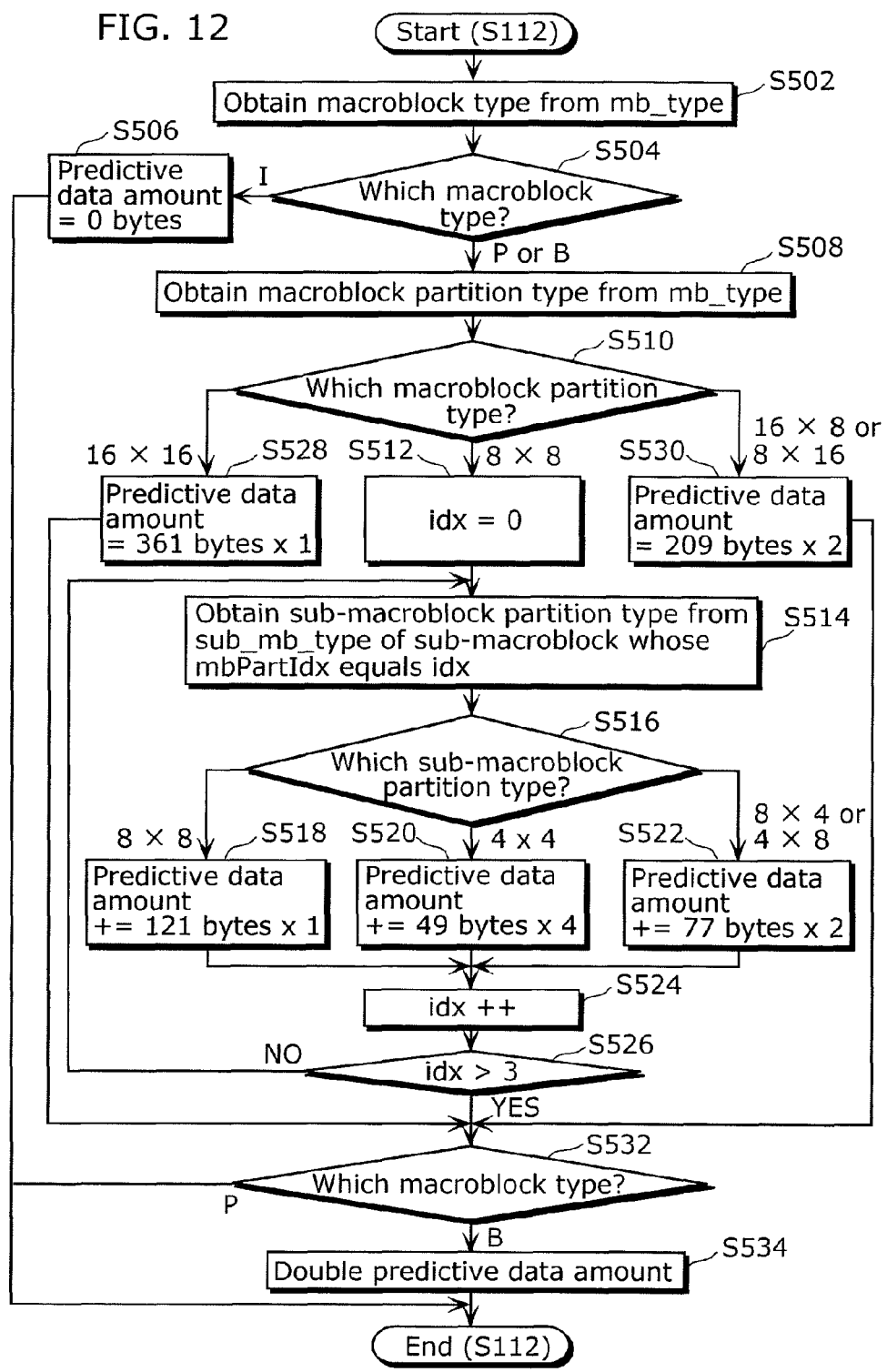
FIG. 12 is a flowchart showing an example of calculation of a predictive data amount, performed by an amount-of-transferred-data prediction unit according to Embodiment 2.

FIG. 12 is a flowchart showing an example of the calculation of the predictive data amount, performed by the amount-of-transferred-data prediction unit 131 according to Embodiment 2. Although FIG. 12 shows the calculation of the predictive data amount for one macroblock, the amount-of-transferred-data prediction unit 131 performs such calculation shown in FIG. 12 for all of the macroblocks included in the picture.

As shown in FIG. 12, the amount-of-transferred-data prediction unit 131 first obtains a macroblock type of a current macroblock to be decoded, from mb_type decoded by the stream parser unit 120 (S502). The details are omitted since this processing is the same as the macroblock type obtainment shown in FIG. 7 according to Embodiment 1 (S202 in FIG. 7).

Then, the amount-of-transferred-data prediction unit 131 determines what is the obtained macroblock type (S504).

In the case of determining that the obtained macroblock type is the macroblock type I ("I" in S504), the amount-of-transferred-data prediction unit 131 calculates the predictive data amount as 0 bytes (S506) and ends the processing.

In the case of determining that the obtained macroblock type is the macroblock type P or the macroblock type B ("P or B" in S504), the amount-of-transferred-data prediction unit 131 obtains from mb_type a macroblock partition type of the current macroblock to be decoded (S508).

Figure 13:
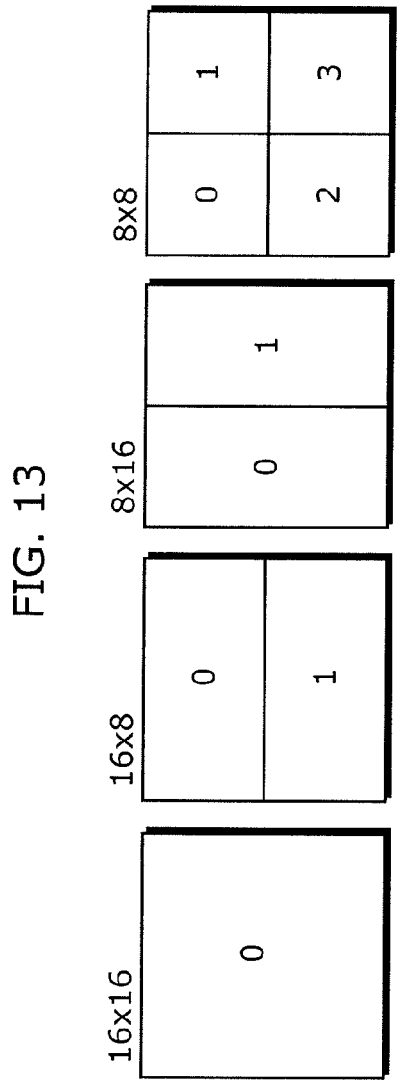
FIG. 13 is a diagram for explaining macroblock partition types.

FIG. 13 is a diagram for explaining macroblock partition types.

As shown in FIG. 13, mb_type defines four macroblock partition types, namely, 16×16 pixels, 16×8 pixels, 8×16 pixels, and 8×8 pixels.

Each partition block resulted from the macroblock partitioning is assigned a number called mbPartIdx (macroblock partition index). For example, when the macroblock partition type is 8×8 pixels, it means that the macroblock is made up of four partition blocks having mbPartIdx of 0 to 3.

As shown in FIGS. 8 and 9, the macroblock partition type can be obtained from the value of mb_type. More specifically, "Name of mb_type" shown in FIGS. 8 and 9 represents a macroblock partition type. Further, "NumMbPart (mb_type)" represents the number of partition blocks of the macroblock, "MbPartWidth (mb_type)" represents the width of the partition blocks of the macroblock, and "MbPartHeight (mb_type)" represents the height of the partition blocks of the macroblock.

In such a manner, the stream parser unit 120 decodes mb_type included in the coded stream, and the amount-of-transferred-data prediction unit 131 obtains from mb_type the macroblock partition type of the current macroblock to be decoded.

Referring back to FIG. 12, the amount-of-transferred-data prediction unit 131 determines what is the obtained macroblock partition type (S510).

In the case where the amount-of-transferred-data prediction unit 131 determines that the obtained macroblock partition type is 8×8 pixels ("8×8" in S510), idx is set to 0 (S512). Here, idx is an integer equal to or greater than 0.

Next, the amount-of-transferred-data prediction unit 131 obtains a sub-macroblock partition type from sub_mb_type of a sub-macroblock whose mbPartIdx equals idx (S514). It is to be noted that sub_mb_type is a parameter obtained when the stream parser unit 120 variable-length decodes the coded stream, and is sent from the stream parser unit 120 to the decoding control unit 130 in advance.

Figure 14:
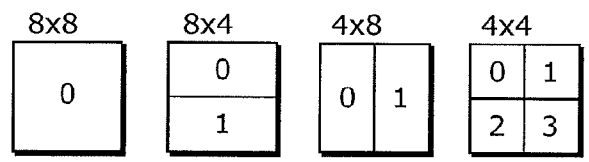
FIG. 14 is a diagram for explaining sub-macroblock partition types.

FIG. 14 is a diagram for explaining sub-macroblock partition types.

As shown in FIG. 14, when the macroblock partition type is 8×8 pixels, the sub-macroblocks of the macroblock, i.e. partition blocks in 8×8 pixels, are further partitioned. The partition types for such sub-macroblock portioning are defined as sub-macroblock partition types, namely, 8×8 pixels, 8×4 pixels, 4×8 pixels, and 4×4 pixels.

Each partition block resulted from the sub-macroblock partitioning is assigned a number called subMbPartIdx (sub-macroblock partition index). For example, when the sub-macroblock partition type is 4×4 pixels, the sub-macroblock is made up of four partition blocks having subMbPartIdx of 0 to 3.

FIG. 15 is a table showing sub-macroblock types and sub-macroblock partition types for P-macroblocks.

FIG. 16 is a table showing sub-macroblock types and sub-macroblock partition types for B-macroblocks.

As shown in FIGS. 15 and 16, when the value of mb_type indicates that the size of partition blocks of the current macroblock is 8×8 pixels, there is further sub_mb_type defined for each of the 8×8-pixel sub-macroblocks. Then, a sub-macroblock partition type can be obtained from the value of sub_mb_type.

More specifically, "Name of sub_mb_type" shown in FIGS. 15 and 16 represents a sub-macroblock partition type. Further, "NumMbPart (sub mb_type)" represents the number of partition blocks of the sub-macroblock, "MbPartWidth (sub_mb_type)" represents the width of the partition blocks of the sub-macroblock, and "MbPartHeight (sub_mb_type)" represents the height of the partition blocks of the sub-macroblock.

In such a manner, the stream parser unit 120 decodes sub_mb_type included in the coded stream, and the amount-of-transferred-data prediction unit 131 obtains from sub_mb_type the sub-macroblock partition type of the current macroblock to be decoded.

Referring back to FIG. 12, the amount-of-transferred-data prediction unit 131 determines what is the obtained sub-macroblock partition type (S516).

In the case of determining that the obtained sub-macroblock partition type is the sub-macroblock partition type of 8×8 pixels ("8×8" in S516), the amount-of-transferred-data prediction unit 131 calculates the predictive data amount as 121 bytes (S518).

Further, in the case of determining that the obtained sub-macroblock partition type is the sub-macroblock partition type of 4×4 pixels ("4×4" in S516), the amount-of-transferred-data prediction unit 131 calculates the predictive data amount as 49 bytes×4 (S520).

In the case of determining that the obtained sub-macroblock partition type is the sub-macroblock partition type of 8×4 pixels or 4×8 pixels ("8×4 or 4×8" in S516), the amount-of-transferred-data prediction unit 131 calculates the predictive data amount as 77 bytes×2 (S522).

Then, the amount-of-transferred-data prediction unit 131 adds one to idx (S524) and determines whether or not idx is larger than 3 (S526).

In the case of determining that idx is equal to or smaller than 3 (NO in S526), the amount-of-transferred-data prediction unit 131 repeats the calculation of the predictive data amount (S514 to S524). More specifically, the amount-of-transferred-data prediction unit 131 calculates a predictive data amount for all the partition blocks, i.e. sub-macroblocks.

In the case of determining that the obtained macroblock partition type is 16×16 pixels ("16×16" in S510), the amount-of-transferred-data prediction unit 131 calculates the predictive data amount as 361 bytes (S528).

Further, in the case of determining that the obtained macroblock partition type is 16×8 pixels or 8×16 pixels ("16×8 or 8×16" in S510), the amount-of-transferred-data prediction unit 131 calculates the predictive data amount as 209 bytes×2 (S530).

Now, the following describes in detail the calculation of the predictive data amount based on the macroblock partition type or the sub-macroblock partition type (S518 to S522, S528, S530), which is performed by the amount-of-transferred-data prediction unit 131.

In some cases, H.264 requires a reference image which is located at a sub-pixel position in order to perform the motion compensated prediction at quarter-pixel resolution. In such a case, it is necessary to read out extra reference image data from the external memory 110 in order to calculate a pixel value at a sub-pixel position between two pixels. The prediction method uses the macroblock partition type or the sub-macroblock partition type with such a necessity taken into account.

FIG. 17 is a diagram showing how to calculate pixel values of a reference image which is located at a sub-pixel position according to the H.264 motion compensated prediction in Embodiment 2.

As shown in FIG. 17, a pixel value at a half-pixel position in the middle of two pixels is calculated through a 6-tap FIR (finite impulse response) operation. Therefore, the calculation of the pixel value at the half-pixel position requires six neighboring pixels located at integer-pixel positions.

For example, when a motion vector indicates a sub-pixel position both in the horizontal and vertical directions, generation of a reference image having 16×16 pixels requires extra five pixels both in the horizontal and vertical directions, which means that reference image data of 21×21 pixels is required.

Further, when the motion vector indicates a sub-pixel position in either the horizontal direction or the vertical direction, generation of a reference image having 16×16 pixels requires extra five pixels in either the horizontal direction or the vertical direction, which means that reference image data of 16×21 pixels or 21×16 pixels is required.

As shown in FIG. 17, a pixel value at a quarter-pixel position is calculated by averaging values of a neighboring pixel located at an integer-pixel position and a neighboring pixel located at a half-pixel position. Thus, calculation of the pixel value at the quarter-pixel position requires reference image data having the same data amount as that required for the calculation of a pixel value at a half-pixel position.

When the motion vector indicates a sub-pixel position, extra reference image data is required for the pixel value calculation. Thus, the data amount of a reference image to be obtained from the external memory 110 differs depending on the motion vector.

With H.264, the motion compensated prediction can be performed not only on a block-by-block basis where each block has a size of 16×16 pixels (macroblock) but also on a block-by-block basis where each block has a size of 16×8 pixels, 8×16 pixels, 8×8 pixels, 8×4 pixels, 4×8 pixels, or 4×4 pixels. It is possible to freely select and combine the units of partitioning on a macroblock-by-macroblock basis.

Even when the motion compensated prediction is performed on a block-by-block basis where each block is smaller than 16×16 pixels, five extra pixels are required both in the horizontal and vertical directions for each unit block of the motion compensated prediction in the case where the motion compensated prediction requires a reference image located at a sub-pixel position. For this reason, in the case where the motion compensated prediction requires a reference image located at a sub-pixel position, the amount of extra reference image data increases when the size of unit block of the macroblock partitioning and the motion compensated prediction decreases.

FIG. 18 is a table showing a relationship between the unit block of the H.264 motion compensated prediction and the predictive data amount according to Embodiment 2.

As shown in FIG. 18, the column "unit block of motion compensated prediction" shows the size of the unit block of the motion compensated prediction.

The column "horizontal and vertical positions are both integer-pixel positions" shows the size and data amount of a reference image whose horizontal and vertical positions are both integer-pixel positions, when such a reference image is required for the motion compensated prediction. When the horizontal and vertical positions indicated by the motion vector are both integer-pixel positions, the data amount of the reference image required for the motion compensated prediction is the same as the data amount of the unit block of the motion compensated prediction.

Similarly, the column "horizontal position is sub-pixel position" shows the size and data amount of a reference image whose horizontal position is a sub-pixel position and whose vertical position is an integer-pixel position, when such a reference image is required for the motion compensated prediction.

Further, the column "vertical position is sub-pixel position" shows the size and data amount of a reference image whose vertical position is a sub-pixel position and whose horizontal position is an integer-pixel position, when such a reference image is required for the motion compensated prediction.

The column "horizontal and vertical positions are both sub-pixel positions" shows the size and data amount of a reference image whose horizontal and vertical positions are both sub-pixel positions, when such a reference image is required for the motion compensated prediction.

The column "predictive data amount" shows a predictive value of a data amount of a reference image which is to be actually obtained from the external memory 110. The predictive value of a data amount of a reference image is calculated assuming that the motion vector indicates any position among integer-pixel and sub-pixel positions with equal probability.

More specifically, as shown in FIG. 17, there are four pixels whose "horizontal and vertical positions are both integer-pixel positions", namely, pixels C, D, I, and L. There are six pixels whose "horizontal position is sub-pixel position", namely, pixels a to f. There are six pixels whose "vertical position is sub-pixel position", namely, pixels g to l. There are nine pixels whose "horizontal and vertical positions are both sub-pixel positions", namely, pixels m to u.

Thus, the predictive data amount can be calculated by weighting, by 4:6:6:9, the data amount of a reference image whose "horizontal and vertical positions are both integer-pixel positions", the data amount of a reference image whose "horizontal position is sub-pixel position", the data amount of a reference image whose "vertical position is sub-pixel position", and the data amount of a reference image whose "horizontal and vertical positions are both sub-pixel positions", respectively.

More specifically, the amount-of-transferred-data prediction unit 131 calculates the predictive data amount using the following expression:

(data amount of a reference image whose "horizontal and vertical positions are both integer-pixel positions"×4+data amount of a reference image whose "horizontal position is sub-pixel position"×6+data amount of a reference image whose "vertical position is sub-pixel position"×6+data amount of a reference image whose "horizontal and vertical positions are both sub-pixel positions"×9)/25

In such a manner, the amount-of-transferred-data prediction unit 131 calculates the predictive data amount on a partition block-by-partition block basis by assuming that: a first probability is a probability of reference to a first reference image whose horizontal and vertical positions are both integer-pixel positions; a second probability is a probability of reference to a second reference image whose horizontal position is a sub-pixel position and whose vertical position is an integer-pixel position; a third probability is a probability of reference to a third reference image whose horizontal position is an integer-pixel position and whose vertical position is a sub-pixel position; and a fourth probability is a probability of reference to a fourth reference image whose horizontal and vertical positions are both sub-pixel positions, and by multiplying the data amounts of the first, second, third, and fourth reference images by the first, second, third, and fourth probabilities, respectively, and adding up the resulting products.

Referring back to FIG. 12, next, the amount-of-transferred-data prediction unit 131 determines what is the macroblock type of the current macroblock to be decoded (S532).

In the case of determining that the macroblock type of the current macroblock to be decoded is the macroblock type P ("P" in S532), the amount-of-transferred-data prediction unit 131 ends the processing.

Further, in the case of determining that the macroblock type of the current macroblock to be decoded is the macroblock type B ("B" in S532), the amount-of-transferred-data prediction unit 131 doubles the predictive data amount (S534) and ends the processing.

In other words, the prediction method which uses the macroblock partition type involves obtaining of a macroblock type and a macroblock partition type from mb_type and sub_mb_type included in the macroblock layer. The sum of the predictive data amounts associated with the partition blocks of a macroblock is assumed as the data amount of the reference image to be obtained from the external memory 110.

At this point, in the case where the macroblock is of the macroblock type B, the predictive data amount in FIG. 18 is doubled as the predictive value because two reference images are required. In the case of the macroblock type P, the predictive data amount in FIG. 18 is used as the predictive value because one reference image is required. In the case of the macroblock type I, the predictive value is calculated as zero because no motion compensated prediction is performed.

When the unit block for the motion compensated prediction is larger than 8×8 pixels, MbPartWidth and MbPartHeight which are obtained from mb_type indicate the width and height of each partition block. When the unit block for the motion compensated prediction is equal to or smaller than 8×8 pixels, there is sub_mb_type for each 8×8-pixel block. MbPartWidth and MbPartHeight obtained from sub_mb_type indicate the width and height of each partition block.

With this, the amount-of-transferred-data prediction unit 131 according to Embodiment 2 finishes the calculation of the predictive data amount (S112 in FIG. 6).

As described above, the image decoding device 100 according to Embodiment 2 calculates the predictive data amount using the block partition type information in the case where reference image(s) is referred to on a partition block-by-partition block basis. This enables the calculation of the predictive data amount even when it is necessary to refer to reference image(s) on a partition block-by-partition block basis.

Further, the predictive data amount is calculated for each of the partition blocks further by weighting a data amount of a reference image located at an integer-pixel position and a data amount of a reference image located at a sub-pixel position. This enables the calculation of the predictive data amount which uses not only a data amount of a reference image located at an integer-pixel position, but also a data amount of a reference image located at a sub-pixel position. As a result, the predictive data amount can be calculated more accurately, allowing appropriate selection of blocks to be decoded in parallel.

Furthermore, the predictive data amount is calculated using the probability of reference to a reference image whose horizontal or vertical position is an integer-pixel position or a sub-pixel position. With this, the predictive data amount can be more accurately calculated because the calculation is performed by taking into consideration whether the horizontal or vertical position is an integer-pixel position or a sub-pixel position.

Thus, even when it is necessary to refer to reference image(s) on a partition block-by-partition block basis, it is possible to suppress the momentary increase in the amount of data transferred and perform parallel decoding of the image data with a small memory bandwidth.

Embodiment 3

In Embodiment 3, the stream parser unit 120 further sends the decoding control unit 130, on a macroblock-by-macroblock basis, motion information indicating an amount of motion between an image of a current macroblock to be decoded and a reference image, and the amount-of-transferred-data prediction unit 131 calculates the predictive data amount on a macroblock-by-macroblock basis by further using such motion information.

In other words, in Embodiment 3, the stream parser unit 120 sends the decoding control unit 130 at least mb_type, sub_mb_type, and mvd among the decoded parameters.

More specifically, the amount-of-transferred-data prediction unit 131 determines whether or not the reference image indicated in the motion information is located at a sub-pixel position. In the case of determining that the reference image is located at a sub-pixel position, the amount-of-transferred-data prediction unit 131 calculates a data amount of the reference image located at the sub-pixel position as the predictive data amount.

Here, the processing of Embodiment 3 is the same as that of Embodiment 1 except for the calculation of the predictive data amount that is shown in FIG. 6 and performed by the amount-of-transferred-data prediction unit 131 (S112 in FIG. 6). Thus, the following describes the details of such different processing (S112 in FIG. 6).

Figure 19:
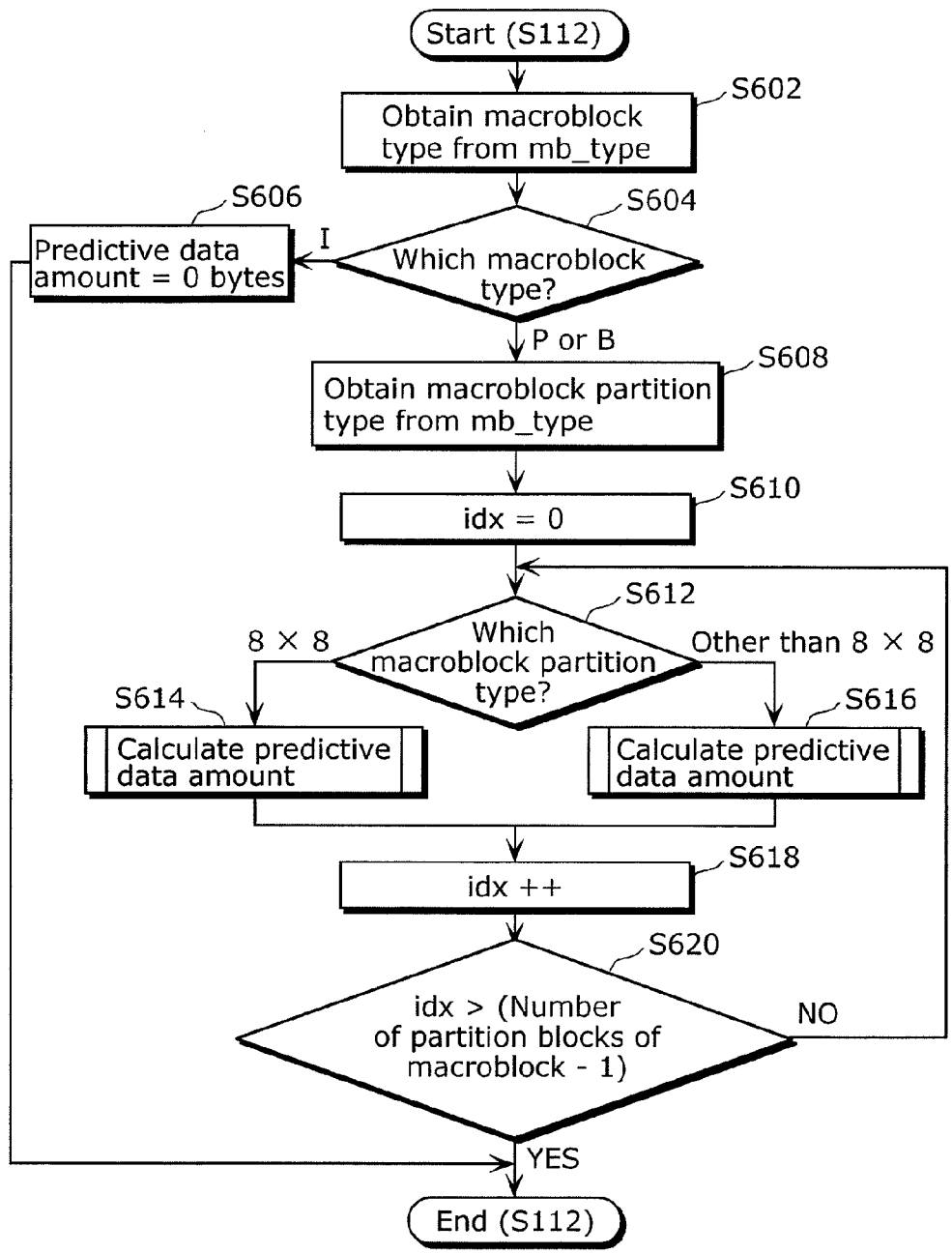
FIG. 19 is a flowchart showing an example of calculation of a predictive data amount, performed by an amount-of-transferred-data prediction unit according to Embodiment 3.

FIG. 19 is a flowchart showing an example of the calculation of the predictive data amount, performed by the amount-of-transferred-data prediction unit 131 according to Embodiment 3. Although FIG. 19 shows the calculation of the predictive data amount for one macroblock, the amount-of-transferred-data prediction unit 131 performs such calculation shown in FIG. 19 for all the macroblocks included in the picture.

As shown in FIG. 19, the amount-of-transferred-data prediction unit 131 first obtains a macroblock type of a current macroblock to be decoded, from mb_type decoded by the stream parser unit 120 (S602). The details are omitted since this processing is the same as the macroblock type obtainment shown in FIG. 7 according to Embodiment 1 (S202 in FIG. 7).

Then, the amount-of-transferred-data prediction unit 131 determines what is the obtained macroblock type (S604).

In the case of determining that the obtained macroblock type is the macroblock type I ("I" in S604), the amount-of-transferred-data prediction unit 131 calculates the predictive data amount as 0 bytes (S606) and ends the processing.

In the case of determining that the obtained macroblock type is the macroblock type P or the macroblock type B ("P or B" in S604), the amount-of-transferred-data prediction unit 131 obtains from mb_type a macroblock partition type of the current macroblock to be decoded (S608). The details are omitted since this processing is the same as the macroblock partition type obtainment shown in FIG. 12 according to Embodiment 2 (S508 in FIG. 12).

Then, the amount-of-transferred-data prediction unit 131 sets idx to zero (S610).

Subsequently, the amount-of-transferred-data prediction unit 131 determines what is the obtained macroblock partition type (S612).

In the case of determining that the obtained macroblock partition type is 8×8 pixels ("8×8" in S612), the amount-of-transferred-data prediction unit 131 calculates the predictive data amount when the macroblock partition type is 8×8 pixels (S614). This calculation of the predictive data amount when the macroblock partition type is 8×8 pixels, performed by the amount-of-transferred-data prediction unit 131, is described later.

In the case of determining that the obtained macroblock partition type is other than 8×8 pixels ("other than 8×8" in S612), the amount-of-transferred-data prediction unit 131 calculates the predictive data amount when the macroblock partition type is other than 8×8 pixels (S616). This calculation of the predictive data amount when the macroblock partition type is other than 8×8 pixels, performed by the amount-of-transferred-data prediction unit 131, is described later.

Then, the amount-of-transferred-data prediction unit 131 adds one to idx (S618) and determines whether or not idx is larger than the "number of partition blocks of the macroblock−1" (S620).

In the case of determining that idx is equal to or smaller than the "number of partition blocks of the macroblock−1" (NO in S620), the amount-of-transferred-data prediction unit 131 repeats the calculation of the predictive data amount (S612 to S618). More specifically, the amount-of-transferred-data prediction unit 131 calculates a predictive data amount for all the partition blocks of the macroblock.

In the case of determining that idx is larger than the "number of partition blocks of the macroblock−1" (YES in S620), the amount-of-transferred-data prediction unit 131 ends the processing.

With this, the amount-of-transferred-data prediction unit 131 according to Embodiment 3 finishes the calculation of the predictive data amount (S112 in FIG. 6).

Next, the following describes the details of the calculation of the predictive data amount when the macroblock partition type is 8×8 pixels (S614 in FIG. 19), which is performed by the amount-of-transferred-data prediction unit 131.

Figure 20:
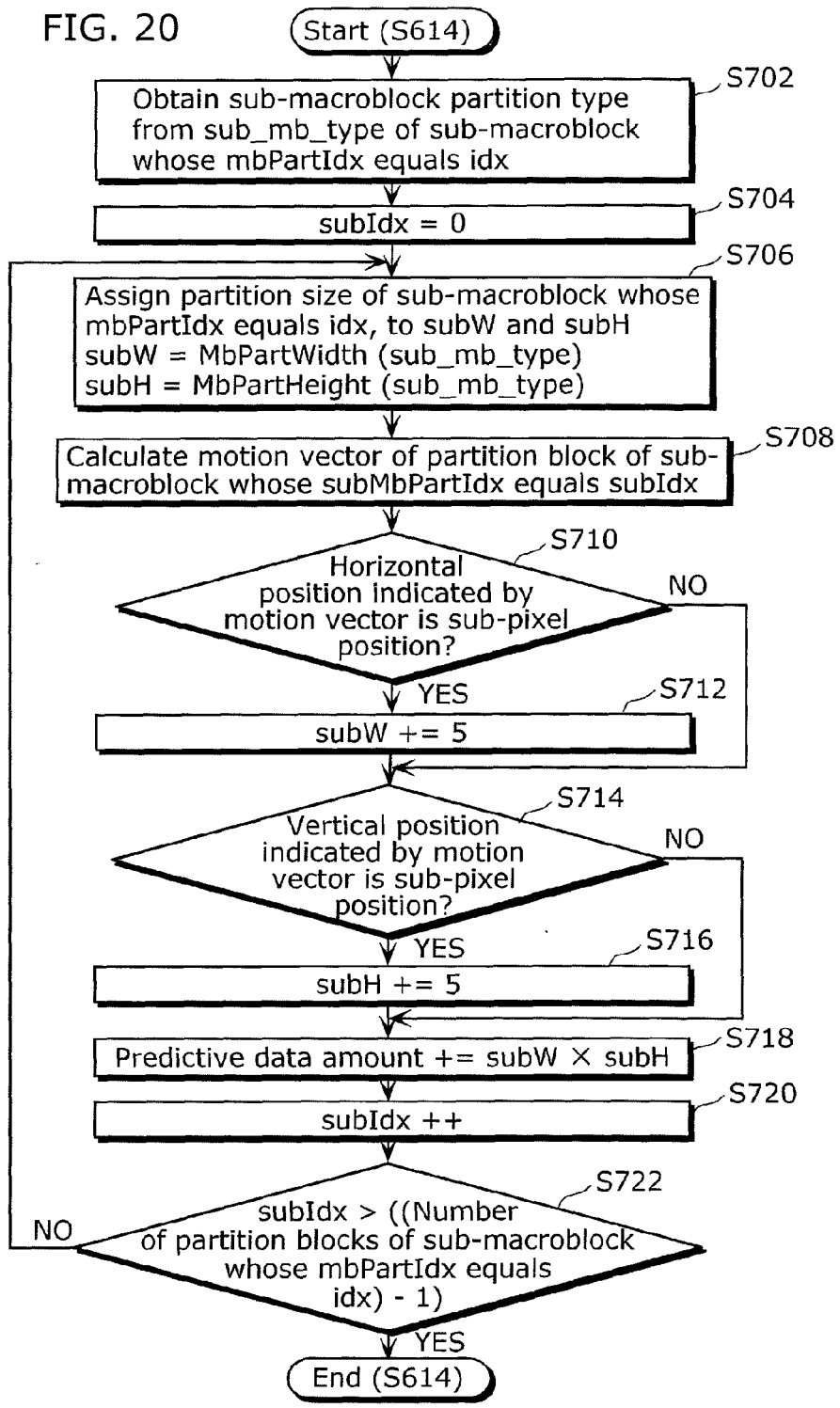
FIG. 20 is a flowchart showing an example of calculation of a predictive data amount when the macroblock partition type is 8×8 pixels, performed by an amount-of-transferred-data prediction unit according to Embodiment 3.

FIG. 20 is a flowchart showing an example of the calculation of the predictive data amount when the macroblock partition type is 8×8 pixels, performed by the amount-of-transferred-data prediction unit 131 according to Embodiment 3.

When the macroblock partition type of the current macroblock to be decoded is 8×8 pixels, there is a sub-macroblock partition type for each 8×8-pixel sub-macroblock.

Thus, the amount-of-transferred-data prediction unit 131 first obtains a sub-macroblock partition type from sub_mb_type of a sub-macroblock whose mbPartIdx equals idx (S702). It is to be noted that sub_mb_type is a parameter obtained when the stream parser unit 120 variable-length decodes the coded stream, and is sent from the stream parser unit 120 to the decoding control unit 130 in advance.

Then, the amount-of-transferred-data prediction unit 131 sets subIdx to zero (S704). Here, subIdx is an integer equal to or greater than 0.

Subsequently, the amount-of-transferred-data prediction unit 131 obtains the partition size of the sub-macroblock whose mbPartIdx equals idx, and assigns the partition size to subW and subH (S706).

More specifically, the amount-of-transferred-data prediction unit 131 obtains "MbPartWidth (sub_mb_type)" that is the width of partition block(s) of the sub-macroblock and "MbPartHeight (sub_mb_type)" that is the height of the partition block(s) of the sub-macroblock shown in FIGS. 15 and 16. Then, the amount-of-transferred-data prediction unit 131 assigns MbPartWidth (sub_mb_type) to subW and MbPartHeight (sub_mb_type) to subH.

Subsequently, the amount-of-transferred-data prediction unit 131 calculates a motion vector of a partition block of the sub-macroblock whose subMbPartIdx equals subIdx (S708). More specifically, the amount-of-transferred-data prediction unit 131 first calculates a motion vector of a partition block of a sub-macroblock whose subMbPartIdx equals 0. It is to be noted that the amount-of-transferred-data prediction unit 131 calculates the motion vector using mvd which has been sent from the stream parser unit 120 to the decoding control unit 130.

Then, the amount-of-transferred-data prediction unit 131 determines whether or not the horizontal position indicated by the motion vector is a sub-pixel position (S710).

In the case of determining that the horizontal position indicated by the motion vector is a sub-pixel position (YES in S710), the amount-of-transferred-data prediction unit 131 adds five to subW (S712). In other words, the amount-of-transferred-data prediction unit 131 increases the width of the partition block of the sub-macroblock by five pixels.

In the case of determining that the horizontal position indicated by the motion vector is not a sub-pixel position (NO in S710), the amount-of-transferred-data prediction unit 131 does not add anything to subW but proceeds to the next step (S714).

Next, the amount-of-transferred-data prediction unit 131 determines whether or not the vertical position indicated by the motion vector is a sub-pixel position (S714).

In the case of determining that the vertical position indicated by the motion vector is a sub-pixel position (YES in S714), the amount-of-transferred-data prediction unit 131 adds five to subH (S716). In other words, the amount-of-transferred-data prediction unit 131 increases the height of the partition block of the sub-macroblock by five pixels.

In the case of determining that the vertical position indicated by the motion vector is not a sub-pixel position (NO in S714), the amount-of-transferred-data prediction unit 131 does not add anything to subH but proceeds to the next step (S718).

Next, the amount-of-transferred-data prediction unit 131 calculates the predictive data amount by multiplying subW by subH (S718).

Subsequently, the amount-of-transferred-data prediction unit 131 adds one to subIdx (S720) and determines whether or not subIdx is larger than a value obtained by subtracting one from the number of partition blocks of the sub-macroblock whose mbPartIdx equals idx (S722).

In the case of determining that subIdx is equal or smaller than the value obtained by subtracting one from the number of partition blocks of the sub-macroblock whose mbPartIdx equals idx (NO in S722), the amount-of-transferred-data prediction unit 131 repeats the calculation of the predictive data amount (S706 to S720). More specifically, the amount-of-transferred-data prediction unit 131 calculates a predictive data amount for all the partition blocks of the sub-macroblock (S706 to S720).

In the case of determining that subIdx is larger than the value obtained by subtracting one from the number of partition blocks of the sub-macroblock whose mbPartIdx equals idx (YES in S722), the amount-of-transferred-data prediction unit 131 ends the processing.

With this, the amount-of-transferred-data prediction unit 131 according to Embodiment 3 finishes the calculation of the predictive data amount when the macroblock partition type is 8×8 pixels (S614 in FIG. 19).

Next, the following describes the details of the calculation of the predictive data amount when the macroblock partition type is other than 8×8 pixels (S616 in FIG. 19), which is performed by the amount-of-transferred-data prediction unit 131.

Figure 21:
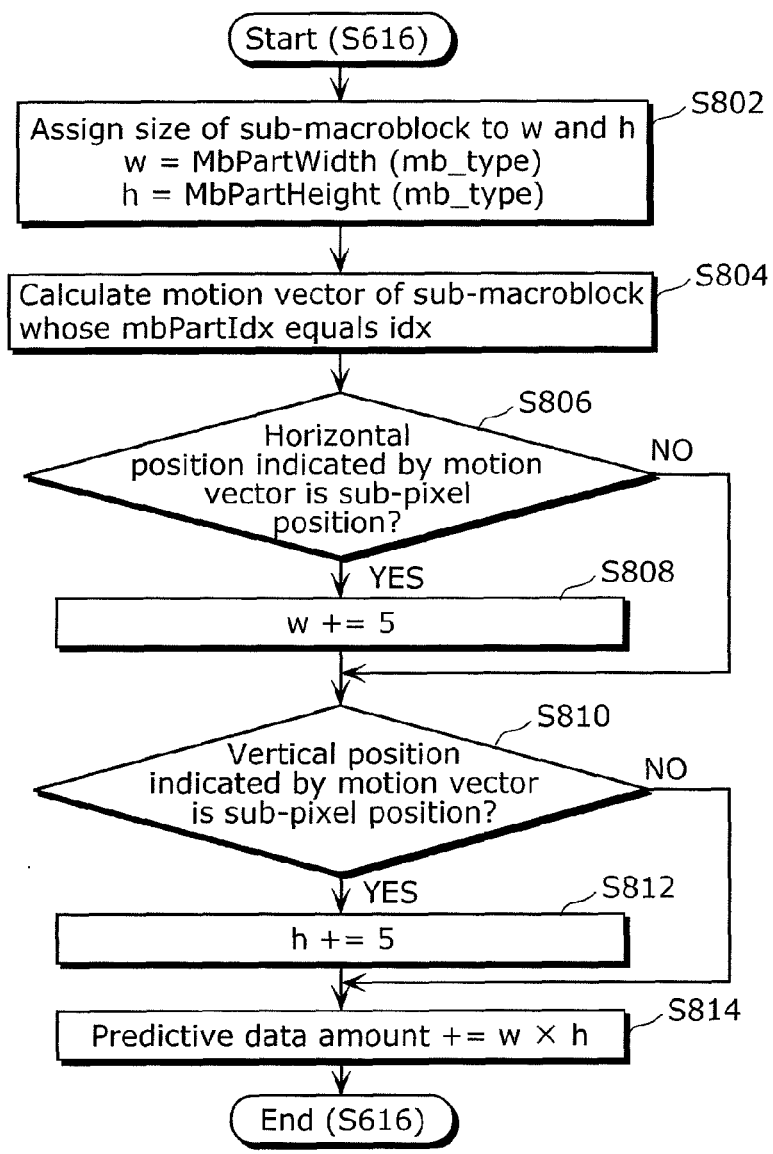
FIG. 21 is a flowchart showing an example of calculation of a predictive data amount when the macroblock partition type is other than 8×8 pixels, performed by an amount-of-transferred-data prediction unit according to Embodiment 3.

FIG. 21 is a flowchart showing an example of the calculation of the predictive data amount when the macroblock partition type is other than 8×8 pixels, performed by the amount-of-transferred-data prediction unit 131 according to Embodiment 3.

In the case where the macroblock partition type of the current macroblock to be decoded is other than 8×8 pixels, there is no sub-macroblock partition type for the sub-macroblock(s) because the sub-macroblock(s) is the minimum unit for the decoding.

Thus, the amount-of-transferred-data prediction unit 131 first obtains the size of the sub-macroblock(s) and assigns the size to w and h (S802).

More specifically, the amount-of-transferred-data prediction unit 131 obtains "MbPartWidth (mb_type)" that is the width of partition block(s) of the macroblock and "MbPartHeight (mb_type)" that is the height of the partition block(s) of the macroblock shown in FIGS. 8 and 9. Then, the amount-of-transferred-data prediction unit 131 assigns MbPartWidth (mb_type) to w and MbPartHeight (mb_type) to h.

Subsequently, the amount-of-transferred-data prediction unit 131 calculates a motion vector of a sub-macroblock whose mbPartIdx equals idx (S804). More specifically, the amount-of-transferred-data prediction unit 131 first calculates a motion vector of a sub-macroblock whose mbPartIdx equals 0.

Then, the amount-of-transferred-data prediction unit 131 determines whether or not the horizontal position indicated by the motion vector is a sub-pixel position (S806).

In the case of determining that the horizontal position indicated by the motion vector is a sub-pixel position (YES in S806), the amount-of-transferred-data prediction unit 131 adds five to w (S808). In other words, the amount-of-transferred-data prediction unit 131 increases the width of the sub-macroblock by five pixels.

In the case of determining that the horizontal position indicated by the motion vector is not a sub-pixel position (NO in S806), the amount-of-transferred-data prediction unit 131 does not add anything to w but proceeds to the next step (S810).

Next, the amount-of-transferred-data prediction unit 131 determines whether or not the vertical position indicated by the motion vector is a sub-pixel position (S810).

In the case of determining that the vertical position indicated by the motion vector is a sub-pixel position (YES in S810), the amount-of-transferred-data prediction unit 131 adds five to h (S812). In other words, the amount-of-transferred-data prediction unit 131 increases the height of the sub-macroblock by five pixels.

In the case of determining that the vertical position indicated by the motion vector is not a sub-pixel position (NO in S810), the amount-of-transferred-data prediction unit 131 does not add anything to h but proceeds to the next step (S814).

Next, the amount-of-transferred-data prediction unit 131 calculates the predictive data amount by multiplying w by h (S814).

With this, the amount-of-transferred-data prediction unit 131 according to Embodiment 3 finishes the calculation of the predictive data amount when the macroblock partition type is other than 8×8 pixels (S616 in FIG. 19).

As described above, the image decoding device 100 according to Embodiment 3 calculates the predictive data amount using the motion information. As a result, the predictive data amount can be calculated more accurately, allowing appropriate selection of blocks to be decoded in parallel.

Further, when the reference image is located at a sub-pixel position, the data amount of such a reference image located at a sub-pixel position is calculated as the predictive data amount. As a result, the predictive data amount can be calculated more accurately, allowing appropriate selection of blocks to be decoded in parallel.

This enables suppression of the momentary increase in the amount of data transferred, allowing parallel decoding of the image data with a small memory bandwidth.

Embodiment 4

In Embodiment 4, the amount-of-transferred-data prediction unit 131 determines whether or not the address of the reference image indicated in the motion information is an aligned address, and in the case of determining that the address of the reference image is not an aligned address, corrects such address of the reference image to an aligned address to calculate the predictive data amount.

In other words, when the address of reference image data which is to be read out from the external memory 110 is an unaligned address, the reference image data needs to be read out from an aligned address. Because of this, it is necessary to read out extra reference image data from the external memory 110. When a motion vector is available, it is also possible to calculate an address in the external memory 110 from which the reference image is to be read out, enabling the prediction of the data amount with the address alignment also taken into consideration. In such a manner, with the prediction method which utilizes the accurately-calculated motion vector, it is possible to accurately predict the data amount of the reference image to be transferred.

It is to be noted that the stream parser unit 120 sends the decoding control unit 130 at least mb_type, sub_mb_type, ref_idx, and a parameter such as mvd necessary for motion vector calculation, among the decoded parameters.

Here, the processing of Embodiment 4 is the same as that of Embodiment 3 except for the calculation of a predictive data amount that is shown in FIG. 19 and performed by the amount-of-transferred-data prediction unit 131 (S614 and S616 in FIG. 19). Thus, the following describes the details of such different processing (S614 and S616 in FIG. 19).

First, the following describes the details of the calculation of the predictive data amount when the macroblock partition type is 8×8 pixels (S614 in FIG. 19), which is performed by the amount-of-transferred-data prediction unit 131.

Figure 22:
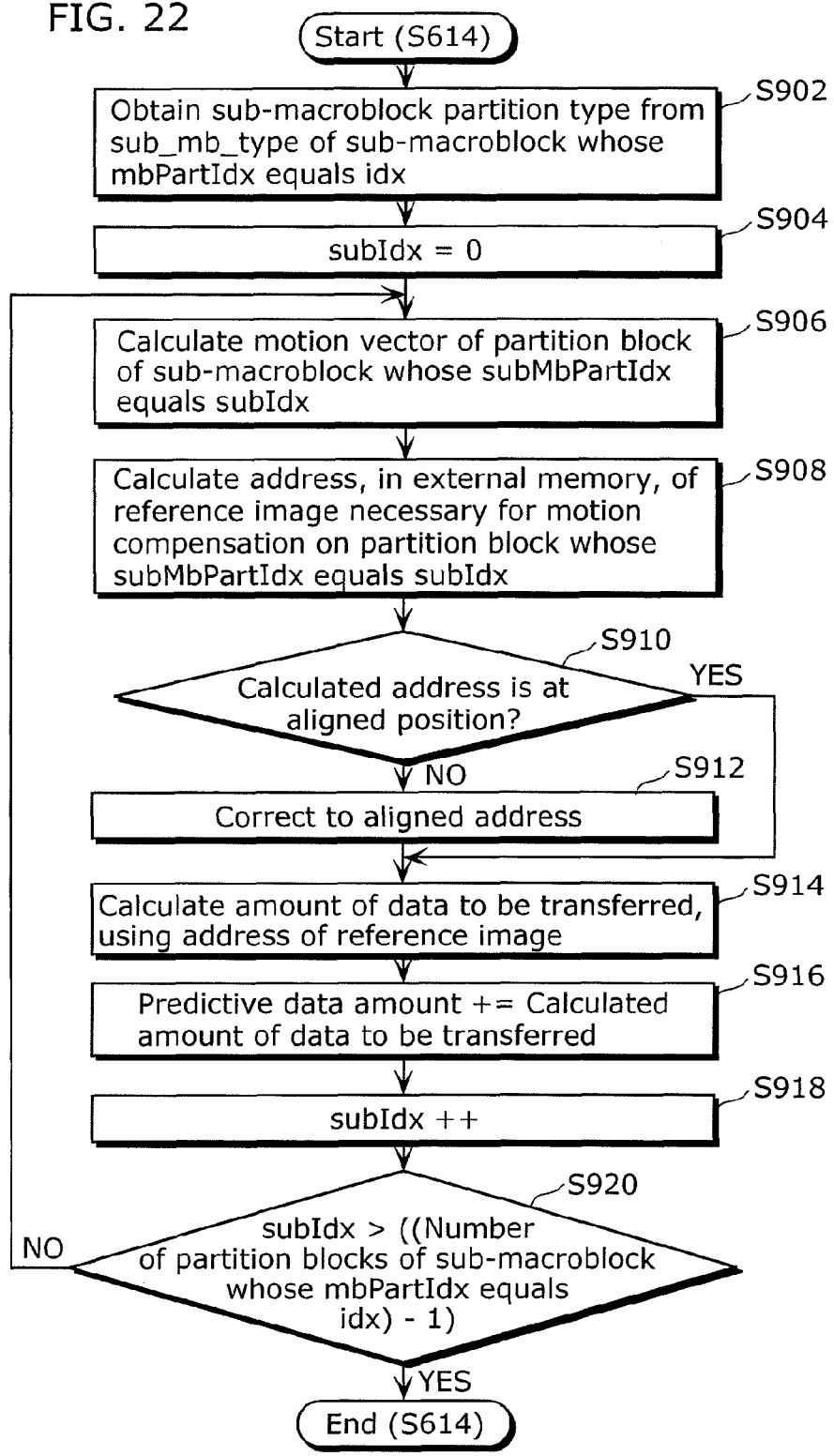
FIG. 22 is a flowchart showing an example of calculation of a predictive data amount when the macroblock partition type is 8×8 pixels, performed by an amount-of-transferred-data prediction unit according to Embodiment 4.

FIG. 22 is a flowchart showing an example of the calculation of the predictive data amount when the macroblock partition type is 8×8 pixels, performed by the amount-of-transferred-data prediction unit 131 according to Embodiment 4.

First, the amount-of-transferred-data prediction unit 131 obtains a sub-macroblock partition type from sub_mb_type of a sub-macroblock whose mbPartIdx equals idx (S902). It is to be noted that sub_mb_type is a parameter obtained when the stream parser unit 120 variable-length decodes the coded stream, and is sent from the stream parser unit 120 to the decoding control unit 130 in advance.

Then, the amount-of-transferred-data prediction unit 131 sets subIdx to zero (S904).

Subsequently, the amount-of-transferred-data prediction unit 131 calculates a motion vector of a partition block of the sub-macroblock whose subMbPartIdx equals subIdx (S906). More specifically, the amount-of-transferred-data prediction unit 131 first calculates a motion vector of a partition block of a sub-macroblock whose subMbPartIdx equals 0. It is to be noted that the amount-of-transferred-data prediction unit 131 calculates the motion vector using mvd which has been sent from the stream parser unit 120 to the decoding control unit 130.

Then, the amount-of-transferred-data prediction unit 131 calculates the address, in the external memory 110, of a reference image necessary for the motion compensation on the partition block whose subMbPartIdx equals subIdx, using the macroblock type, the sub-macroblock partition type, the motion vector of the partition block whose subMbPartIdx equals subIdx, and ref_idx indicating which frame is to be used as the reference image (S908). It is to be noted that ref_idx is a parameter obtained when the stream parser unit 120 variable-length decodes the coded stream, and is sent from the stream parser unit 120 to the decoding control unit 130 in advance.

Next, the amount-of-transferred-data prediction unit 131 determines whether or not the calculated address of the reference image is at an aligned position (S910).

In the case of determining that the calculated address of the reference image is not at an aligned position (NO in S910), the amount-of-transferred-data prediction unit 131 corrects such address of the reference image to an aligned address (S912).

The following describes the correction of the reference image address that is not at an aligned position to an aligned address, which is performed by the amount-of-transferred-data prediction unit 131.

Figure 23:
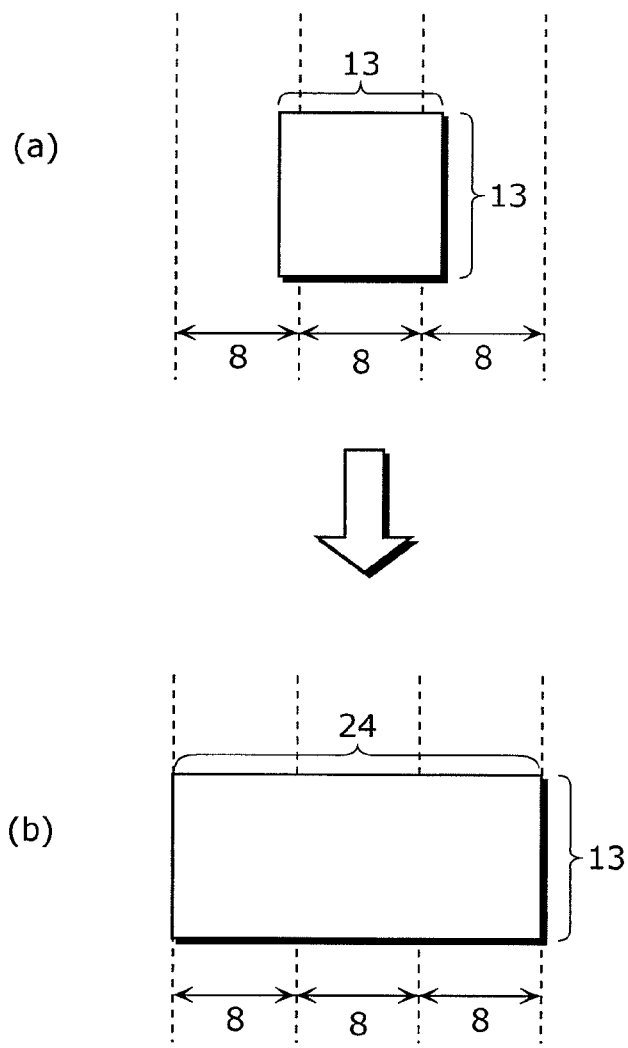
FIG. 23 is a diagram for explaining correction of an address of a reference image to an aligned address, performed by an amount-of-transferred-data prediction unit according to Embodiment 4.

FIG. 23 is a diagram for explaining the correction of the reference image address to an aligned address, performed by the amount-of-transferred-data prediction unit 131 according to Embodiment 4.

As shown in part (a) of FIG. 23, in the case where the external memory 110 is in 8-byte memory alignment (an 8-byte transfer memory), a 13×13-byte reference image straddles the memory alignment boundaries. Such a reference image at an address that straddles the memory alignment boundaries needs to be transferred from an aligned address.

Thus, as shown in part (b) of FIG. 23, the address of the reference image needs to be corrected to an aligned address. More specifically, the data amount of the reference image to be transferred increases from 13×13=169 bytes to 24×13=312 bytes.

In such a manner, the amount-of-transferred-data prediction unit 131 corrects the reference image address that is not at an aligned position to an aligned address.

Referring back to FIG. 22, in the case of determining that the calculated address of the reference image is at an aligned position (YES in S910), the amount-of-transferred-data prediction unit 131 proceeds to the next step (S914).

Next, the amount-of-transferred-data prediction unit 131 calculates the data amount of the reference image to be transferred, using the address of the reference image (S914). For example, in the case of FIG. 23, the amount-of-transferred-data prediction unit 131 calculates that the data amount of the reference image to be transferred is 312 bytes.

Then, the amount-of-transferred-data prediction unit 131 calculates the predictive data amount of the reference image such that the predictive data amount of the reference image equals the above-calculated data amount of the reference image to be transferred (S916).

Subsequently, the amount-of-transferred-data prediction unit 131 adds one to subIdx (S918), and determines whether or not subIdx is larger than a value obtained by subtracting one from the number of partition blocks of the sub-macroblock whose mbPartIdx equals idx (S920).

In the case of determining that subIdx is equal to or less than the value obtained by subtracting one from the number of partition blocks of the sub-macroblock whose mbPartIdx equals idx (NO in S920), the amount-of-transferred-data prediction unit 131 repeats the calculation of the predictive data amount (S906 to S918). More specifically, the amount-of-transferred-data prediction unit 131 calculates a predictive data amount for all the partition blocks of the sub-macroblock (S906 to S918).

In the case of determining that subIdx is larger than the value obtained by subtracting one from the number of partition blocks of the sub-macroblock whose mbPartIdx equals idx (YES in S920), the amount-of-transferred-data prediction unit 131 ends the processing.

With this, the amount-of-transferred-data prediction unit 131 according to Embodiment 4 finishes the calculation of the predictive data amount when the macroblock partition type is 8×8 pixels (S614 in FIG. 19).

Next, the following describes the details of the calculation of the predictive data amount when the macroblock partition type is other than 8×8 pixels (S616 in FIG. 19), which is performed by the amount-of-transferred-data prediction unit 131.

Figure 24:
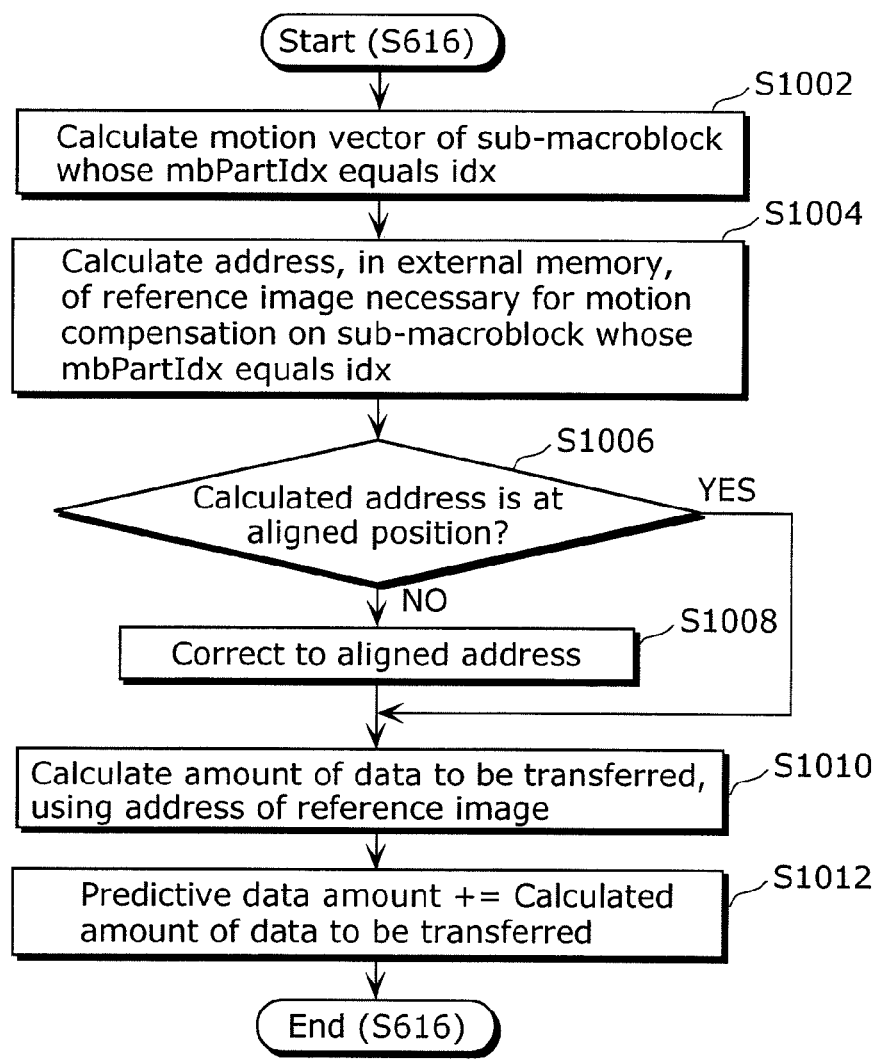
FIG. 24 is a flowchart showing an example of calculation of a predictive data amount when the macroblock partition type is other than 8×8 pixels, performed by an amount-of-transferred-data prediction unit according to Embodiment 4.

FIG. 24 is a flowchart showing an example of the calculation of the predictive data amount when the macroblock partition type is other than 8×8 pixels, performed by the amount-of-transferred-data prediction unit 131 according to Embodiment 4.

First, the amount-of-transferred-data prediction unit 131 calculates a motion vector of a sub-macroblock whose mbPartIdx equals idx (S1002). It is to be noted that the amount-of-transferred-data prediction unit 131 calculates the motion vector using mvd which has been sent from the stream parser unit 120 to the decoding control unit 130.

Then, the amount-of-transferred-data prediction unit 131 calculates an address, in the external memory 110, of a reference image necessary for the motion compensation on the sub-macroblock whose mbPartIdx equals idx, using the macroblock type, the macroblock partition type, the motion vector of the sub-macroblock whose mbPartIdx equals idx, and ref_idx indicating which frame is to be used as the reference image (S1004). It is to be noted that ref_idx is a parameter obtained when the stream parser unit 120 variable-length decodes the coded stream, and is sent from the stream parser unit 120 to the decoding control unit 130 in advance.

Next, the amount-of-transferred-data prediction unit 131 determines whether or not the calculated address of the reference image is at an aligned position (S1006).

In the case of determining that the calculated address of the reference image is not at an aligned position (NO in S1006), the amount-of-transferred-data prediction unit 131 corrects the address of the reference image to an aligned address (S1008).

In the case of determining that the calculated address of the reference image is at an aligned position (YES in S1006), the amount-of-transferred-data prediction unit 131 proceeds to the next step (S1010).

Next, the amount-of-transferred-data prediction unit 131 calculates the data amount of the reference image to be transferred, using the address of the reference image (S1010). For example, in the case of FIG. 23, the amount-of-transferred-data prediction unit 131 calculates that the data amount of the reference image to be transferred is 312 bytes.

Then, the amount-of-transferred-data prediction unit 131 calculates the predictive data amount of the reference image such that the predictive data amount of the reference image equals the above-calculated data amount of the reference image to be transferred (S1012).

With this, the amount-of-transferred-data prediction unit 131 according to Embodiment 4 finishes the calculation of the predictive data amount when the macroblock partition type is other than 8×8 pixels (S616 in FIG. 19).

As described above, in the case where the address of the reference image is not an aligned address, the image decoding device 100 according to Embodiment 4 corrects such address of the reference image to an aligned address to calculate the predictive data amount. As a result, the predictive data amount can be calculated more accurately, allowing appropriate selection of blocks to be decoded in parallel. This enables suppression of the momentary increase in the amount of data transferred, allowing parallel decoding of the image data with a small memory bandwidth.

Embodiment 5

In Embodiment 5, the block determination unit 132 determines multiple macroblocks in the coded image data which are to be decoded in parallel, by changing the number of macroblocks to be decoded in parallel using the predictive data amount in such a manner as to reduce variation in the amounts of data read out from the external memory 110.

Here, the processing of Embodiment 5 is the same as that of Embodiment 1 except for the determination of macroblocks to be decoded in parallel that is shown in FIG. 6 and performed by the block determination unit 132 (S114 in FIG. 6). Thus, the following describes the details of such different processing (S114 in FIG. 6).

Figure 25:
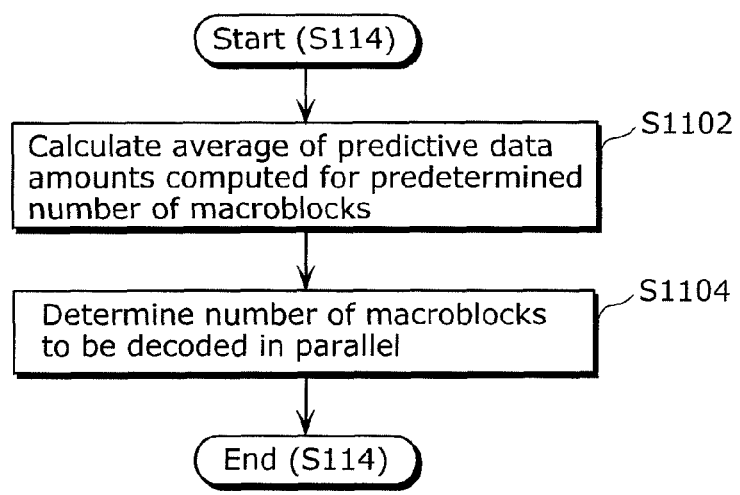
FIG. 25 is a flowchart showing an example of determination of macroblocks to be decoded in parallel, performed by a block determination unit according to Embodiment 5.

FIG. 25 is a flowchart showing an example of the determination of macroblocks to be decoded in parallel, performed by the block determination unit 132 according to Embodiment 5.

First, the block determination unit 132 calculates the average of predictive data amounts computed for a predetermined number of macroblocks (S1102). Here, the predetermined number of macroblocks may be all the macroblocks included in the picture or macroblocks whose decoding order has already been determined by the block determination unit 132.

Then, the block determination unit 132 determines the number of macroblocks to be decoded in parallel such that the average of predictive data amounts calculated for the multiple macroblocks to be decoded in parallel approaches the average of predictive data amounts calculated for the predetermined number of macroblocks (S1104).

Figure 26:
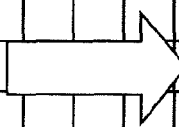
FIG. 26 is a diagram for explaining determination of macroblocks to be decoded in parallel, performed by a block determination unit according to Embodiment 5.

FIG. 26 is a diagram for explaining the determination of the number of macroblocks to be decoded in parallel, performed by the block determination unit 132 according to Embodiment 5.

As shown in FIG. 26, the macroblocks are decoded in the decoding order shown in FIG. 26; basically, macroblocks are decoded in ascending order of the number assigned. More specifically, a macroblock is decoded in parallel with: a macroblock located two columns to the left in one row below; and a macroblock located four columns to the left in two rows below; that is, macroblocks are decoded in parallel in units of three rows.

With the decoding order shown in FIG. 2, the number of macroblocks which can be decoded in parallel is in some cases larger than the number of macroblock decoding units. With the decoding order shown in FIG. 26, the number of macroblocks to be decoded in parallel is determined to be 3 or less, considering the fact that there are only three macroblock decoding units.

However, with the decoding order shown in FIG. 26, a large amount of data needs to be transferred momentarily when a macroblock to be decoded in parallel with other macroblocks needs a large amount of data from the external memory 110.

Thus, what is calculated first in this method is the sum of predictive data amounts for the candidate macroblocks which have a same number as candidates to be decoded in parallel.

Then, it is determined whether or not the calculated sum of predictive data amounts is larger than a predetermined data amount, and in the case where the sum is smaller than the predetermined data amount, these three candidate macroblocks are decoded. However, in the case where the sum is larger than the predetermined data amount, one of the candidate macroblocks is not decoded. Any of the candidate macroblocks may be selected as the macroblock not to be decoded. For example, the macroblock located in the lowest row may be selected as the macroblock not to be decoded.

That is to say, by reducing the number of macroblocks to be decoded in parallel to two, the amount of data to be transferred from the external memory 110 is suppressed. When the next macroblocks are to be decoded, the macroblock which was previously not decoded is determined again whether or not it should be decoded, together with other candidate macroblocks.

For example, consider the case where three macroblocks numbered 6 as shown in FIG. 26 are the candidate macroblocks. First, predictive data amounts calculated for the macroblocks numbered 6 is summed, and in the case where the sum is smaller than the predetermined data amount, these three macroblocks are decoded. In the case where the sum is larger than the predetermined data amount, the macroblocks numbered 6 located in the first and second rows from the top are decoded, but the macroblock numbered 6 located in the third row from the top is not decoded.

Next, macroblocks to be decoded are determined, as the candidate macroblocks, among the macroblocks numbered 7 in the first and second rows and the previously-not-decoded macroblock numbered 6 in the third row.

If the sum of predictive data amounts is still larger than the predetermined data amount even after the number of macroblocks to be decoded in parallel is reduced to two, the number of macroblocks to be decoded in parallel may be further reduced.

By doing so, it is possible to prevent the case where the amount of data to be transferred from the external memory 110 becomes larger than the predetermined data amount. As a result, in the case where the external memory 110 is shared with another device, it is possible to prevent a situation where the image decoding device according to Embodiment 5 occupies the memory bandwidth and the other device cannot transfer enough data from the external memory 110.

With this, the block determination unit 132 according to Embodiment 5 finishes the determination of macroblocks to be decoded in parallel (S114 in FIG. 6).

As described above, the image decoding device 100 according to Embodiment 5 determines multiple macroblocks to be decoded in parallel, by changing the number of macroblocks to be decoded in parallel in such a manner as to reduce variation in the amounts of data read out from the external memory 110. With this, the number of macroblocks can be changed such that there is no momentary increase in the amount of data transferred. This enables suppression of the momentary increase in the amount of data transferred, allowing parallel decoding of the image data with a small memory bandwidth.

Embodiment 6

In Embodiment 1 above, the macroblock decoding order is determined prior to the macroblock decoding. However, only the prediction of the data amount of the reference image to be transferred may be performed in advance, and the decoding order may be adaptively determined while the macroblocks are decoded in parallel. For example, in the case where another device different from the image decoding device 100 according to Embodiment 1 also accesses the external memory 110, a macroblock for which a reference image having a small amount of data is to be transferred is selected to be decoded, when the other device accesses the external memory 110. In this way, the image decoding device 100 and the other device can operate concurrently.

As described above, in Embodiment 6, the block determination unit 132 determines multiple macroblocks to be decoded in parallel such that the sum of predictive data amounts calculated for the multiple macroblocks to be decoded in parallel approaches a differential data amount, which is a data amount obtained by subtracting an amount of data transferred for the other device from a maximum amount of data transferable from the external memory 110.

More specifically, the block determination unit 132 determines multiple macroblocks to be decoded in parallel such that the sum of predictive data amounts calculated for the multiple macroblocks to be decoded in parallel increases when the differential data amount is larger.

Further, the block determination unit 132 determines multiple macroblocks to be decoded in parallel such that the sum of predictive data amounts calculated for the multiple macroblocks to be decoded in parallel decreases when the differential data amount is smaller.

Figure 27:
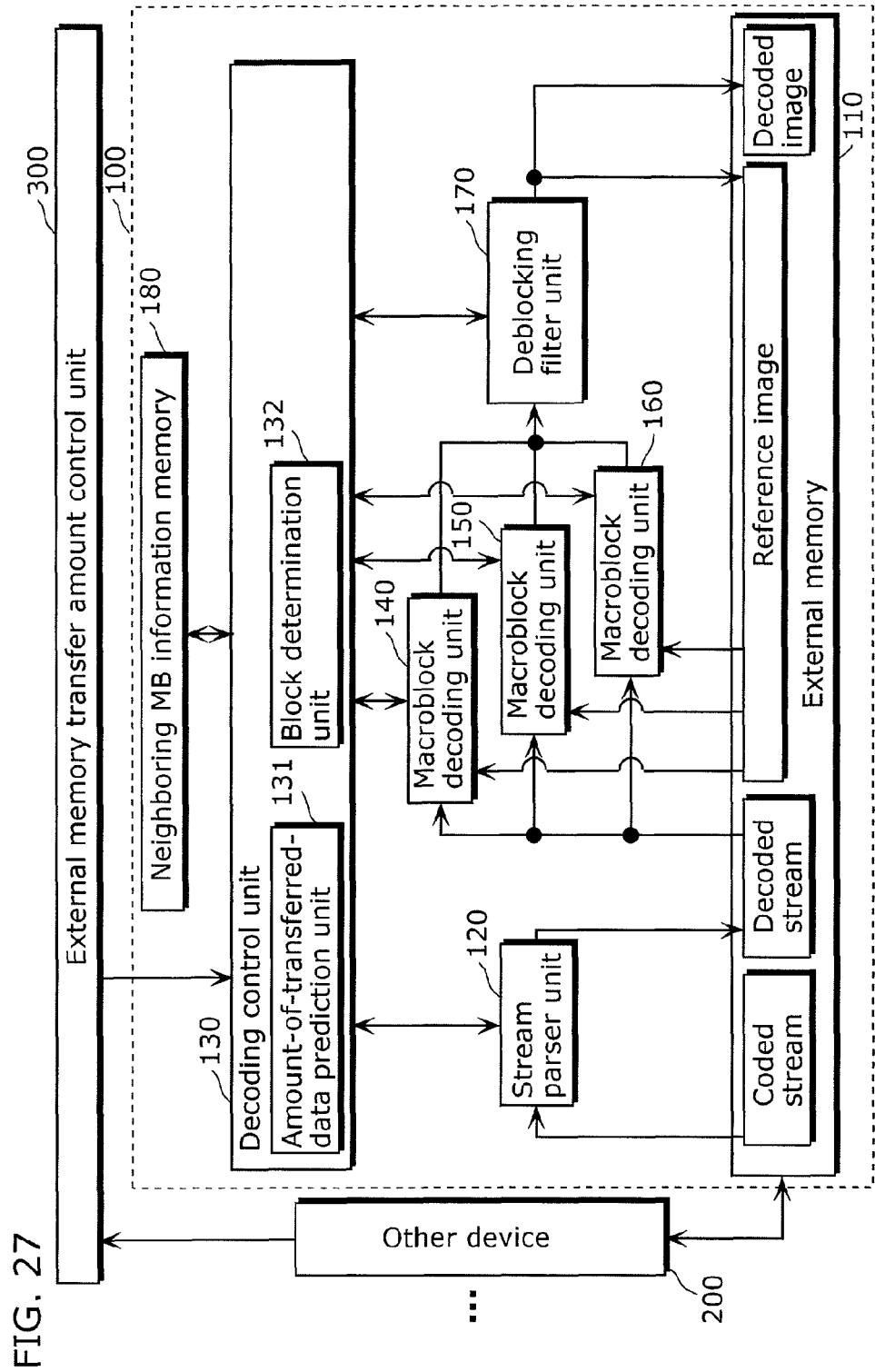
FIG. 27 is a block diagram showing a functional structure according to Embodiment 6 in the case where another device accesses an external memory of an image decoding device.

FIG. 27 is a block diagram showing a functional structure according to Embodiment 6 in the case where an other device 200 accesses the external memory 110 of the image decoding device 100. Here, the image decoding device 100 is the same in structure as the image decoding device 100 according to Embodiment 1 illustrated in FIG. 3, and thus the detailed description thereof is omitted.

As shown in FIG. 27, the other device 200 is a device that is different from the image decoding device 100 and accesses the external memory 110 of the image decoding device 100. The number of the other device 200 may be one or more.

The other device 200 is, for example, an image coding block, an audio decoding block, an audio coding block, a processor block, a graphics accelerator, or the like. The other device 200 may be any device as long as it shares the external memory 110 with the image decoding device 100.

An external memory transfer amount control unit 300 receives from the other device 200 an amount of data transferred between the other device 200 and the external memory 110. Then, the external memory transfer amount control unit 300 notifies the decoding control unit 130 in the image decoding device 100 of a data transfer amount that is obtained by subtracting the amount of data transferred for the other device 200 from a maximum transfer performance (a maximum amount of data which can be transferred) of the external memory 110.

The decoding control unit 130 selectively decodes macroblocks such that the predictive data amount approaches the notified data transfer amount.

Next, the following describes the determination of macroblocks to be decoded in parallel, which is performed by the block determination unit 132.

Here, the processing of Embodiment 6 is the same as that of Embodiment 1 except for the determination of macroblocks to be decoded in parallel that is shown in FIG. 6 and performed by the block determination unit 132 (S114 in FIG. 6). Thus, the following describes the details of such different processing (S114 in FIG. 6).

Figure 28:
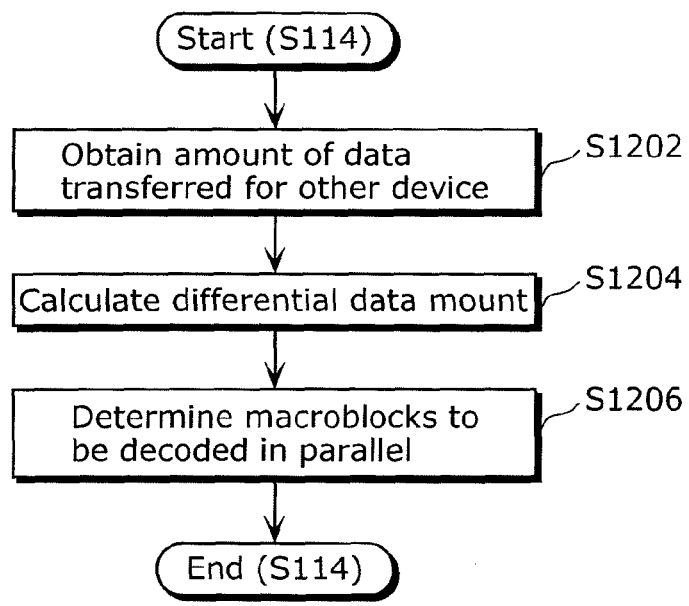
FIG. 28 is a flowchart showing an example of determination of macroblocks to be decoded in parallel, performed by a block determination unit according to Embodiment 6.

FIG. 28 is a flowchart showing an example of the determination of macroblocks to be decoded in parallel, performed by the block determination unit 132 according to Embodiment 6.

As shown in FIG. 28, the external memory transfer amount control unit 300 first obtains from the other device 200 an amount of data transferred between the other device 200 and the external memory 110 (S1202).

Then, the external memory transfer amount control unit 300 calculates a differential data amount by subtracting the amount of data transferred for the other device 200 from a maximum amount of data transferable from the external memory 110 (S1204), and transmits the differential data amount to the block determination unit 132.

The block determination unit 132 determines multiple macroblocks to be decoded in parallel such that the sum of predictive data amounts calculated for the multiple macroblocks to be decoded in parallel approaches the differential data amount (S1206). To be more specific, the block determination unit 132 determines the multiple macroblocks to be decoded in parallel such that the sum of predictive data amounts becomes equal to or smaller than the differential data amount.

With this, the block determination unit 132 according to Embodiment 6 finishes the determination of macroblocks to be decoded in parallel (S114 in FIG. 6).

As described above, the image decoding device 100 according to Embodiment 6 determines multiple blocks to be decoded in parallel such that the sum of predictive data amounts calculated for the multiple blocks to be decoded in parallel approaches the differential data amount. More specifically, multiple blocks to be decoded in parallel are determined such that: the sum of predictive data amounts calculated for the multiple blocks to be decoded in parallel increases when the differential data amount is larger; and the sum of predictive data amounts calculated for the multiple blocks to be decoded in parallel decreases when the differential data amount is smaller. This enables parallel decoding of the image data with a preset memory bandwidth.

More specifically, when the amount of data transferred for the other device 200 is large, it is controlled such that the amount of data to be transferred for the image decoding device 100 decreases. As a result, the data transfer of the other device 200 is not hindered, and the image decoding device 100 and the other device 200 can operate concurrently without causing a delay in the processing of the other device 200.

More specifically, when the amount of data transferred for the other device 200 is small, it is controlled such that the amount of data to be transferred for the image decoding device 100 increases. As a result, the reference image transfer involved in the decoding can be performed at high speed, enabling faster image decoding as a whole.

It is to be noted that the external memory transfer amount control unit 300 does not have to be included in the structure, and instead, the decoding control unit 130 and the other device 200 may directly communicate with each other. More specifically, the block determination unit 132 may obtain from the other device 200 the amount of data transferred for the other device 200, so as to calculate the differential data amount.

Further, in Embodiments 1 to 6, the constituent elements of the image decoding device 100 may be collectively or partially implemented on a single integrated circuit. Furthermore, the image decoding device 100 may be implemented as multiple integrated circuits mounted on a single substrate, or as an independent device connected via a network or a bus.

Figure 29:
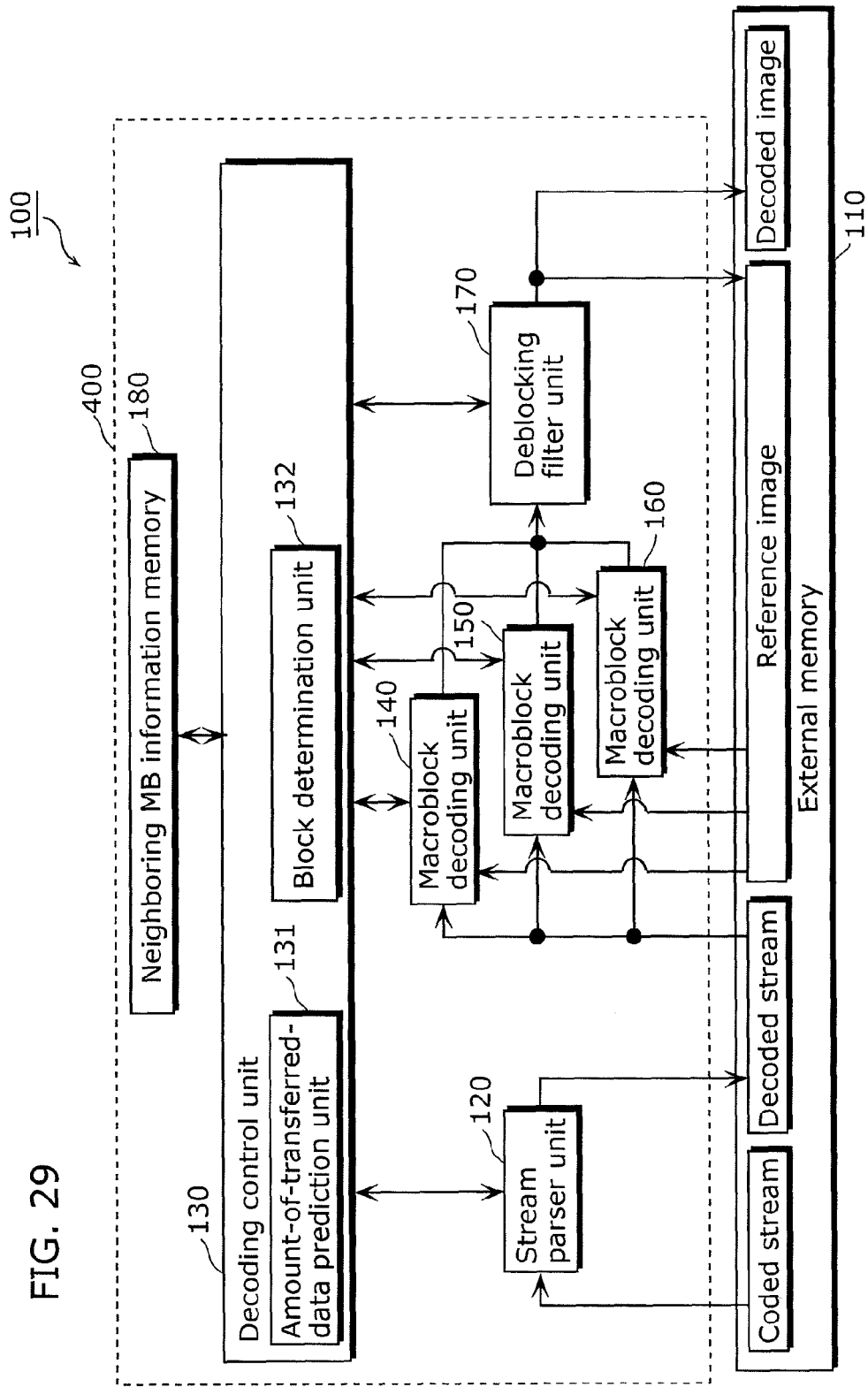
FIG. 29 shows an example of an integrated circuit which controls an image decoding device.

FIG. 29 is a diagram showing an example of an integrated circuit 400 that controls the image decoding device 100.

As shown in FIG. 29, the integrated circuit 400 has the functions of the image decoding device 100 shown in FIG. 3 except for the function of the external memory 110.

The integrated circuit 400 may be configured through implementation of each processing unit in an individual chip or through implementation of some of or all of the processing units in a single chip.

Further, the integrated circuit 400 does not have to include the neighboring MB information memory 180 or the deblocking filter unit. In other words, the integrated circuit 400 can achieve the object of the present invention as long as it includes the stream parser unit 120, the amount-of-transferred-data prediction unit 131, the block determination unit 132, and the macroblock decoding units 140 to 160.

The name used here is LSI, but it may also be called IC, system LSI, super LSI, or ultra LSI depending on the degree of integration.

Moreover, ways to implement the integrated circuit are not limited to LSI, and a special circuit or a general-purpose processor may also be used. It is also possible to use a field programmable gate array (FPGA) that is programmable after LSI manufacturing, or a reconfigurable processor in which the connection and settings for the circuit cell in the LSI are reconfigurable after manufacturing of LSI.

Furthermore, if a technology for implementing an integrated circuit that supersedes LSI is introduced as a result of development in the semiconductor technology or another derivative technology, integration of the functional blocks can surely be implemented using the new technology. Adaptation of biotechnology is one such possibility.

Thus far, the image decoding device according to an aspect of the present invention has been described using the above embodiments. However, the present invention is not limited to such embodiments.

For example, although three macroblock decoding units are used in Embodiments 1 to 6 to decode macroblocks in parallel, the number of macroblock decoding units is not limited to three. Patent Literature 1 discloses a method of decoding macroblocks in parallel using three or more macroblock decoding units. With this method, macroblocks may be decoded using three or more macroblock decoding units. Further, even when the macroblock decoding order is to be determined, it is sufficient that the block determination unit 132 selects macroblocks such that the average of predictive data amounts of reference images which are to be transferred for decoding the macroblocks in parallel becomes as close as possible to the average of predictive data amounts calculated for all the macroblocks. As a result, the decoding can be performed regardless of the number of macroblock decoding units.

In Embodiments 1 to 6, the decoded stream obtained through the complete variable-length decoding by the stream parser unit 120 is output to the external memory 110. However, it is sufficient as long as the stream parser unit 120 is capable of decoding a parameter necessary for the prediction of the amount of data of a reference image to be transferred, and it does not necessarily need to output the decoded stream obtained through the complete variable-length decoding. For example, the stream parser unit 120 may decode only the necessary parameter and output to the external memory 110 an intermediate stream which is decoded only in part necessary for the parallel decoding of macroblocks. In this case, the macroblock decoding units 140 to 160 need to include a variable-length decoding unit to decode the intermediate stream.

Further, in Embodiments 1 to 6, the block determination unit 132 determines macroblocks to be decoded in parallel, after the amount-of-transferred-data prediction unit 131 calculates a predictive data amount for all the macroblocks in the picture. However, the block determination unit 132 may determine macroblocks to be decoded in parallel every time the amount-of-transferred-data prediction unit 131 calculates the predictive data amounts for some of the macroblocks.

Further, in Embodiments 1 to 6, the amount-of-transferred-data prediction unit 131 obtains from mb_type the macroblock type of the current macroblock to be decoded. However, the amount-of-transferred-data prediction unit 131 may obtain from slice_type included in a slice header the macroblock type of the current macroblock to be decoded. In this case, although the accuracy is not so high, the macroblock type of the current macroblock to be decoded can be obtained in the following manner: The macroblock type of a macroblock in an I-slice is the macroblock type I, the macroblock type of a macroblock in a P-slice is the macroblock type P, and the macroblock type of a macroblock in a B-slice is the macroblock type B.

Furthermore, although the amount-of-transferred-data prediction unit 131 in the decoding control unit 130 calculates the predictive data amount in Embodiments 1 to 6, the stream parser unit 120 may calculate the predictive data amount.

Moreover, in Embodiments 1 to 6, the image decoding device 100 includes the external memory 110, the stream parser unit 120, the decoding control unit 130, the macroblock decoding units 140 to 160, the deblocking filter unit 170, and the neighboring MB information memory 180, and the decoding control unit 130 includes the amount-of-transferred-data prediction unit 131 and the block determination unit 132. However, the deblocking filter unit 170 and the neighboring MB information memory 180 are not essential in the structure for achieving the object of the present invention. In other words, it is sufficient as long as the image decoding device 100 includes the external memory 110, the stream parser unit 120, the amount-of-transferred-data prediction unit 131, the block determination unit 132, and the macroblock decoding units 140 to 160. This structure enables the achievement of the object of the present invention.

The embodiments disclosed above have been described as examples in all aspects, and should not be understood as limiting the present invention. The scope of the present invention is indicated by not the above description but the claims, and is intended to include all modifications within the meanings and the scope equivalent to the claims.

In addition, the constituent elements of the above embodiments may be freely combined within the scope of the invention.

INDUSTRIAL APPLICABILITY

The image decoding device according to an aspect of the present invention is capable of decoding video data at high speed. Thus, it is useful as a digital television, a DVD recorder, a Blu-ray Disc® recorder, and so on which handle images compressed by MPEG, for example. In addition, it can be used in appliances for broadcast stations, for example, that are required to perform processing at high speed.

REFERENCE SIGNS LIST

100 Image decoding device
110 External memory
120 Stream parser unit
130 Decoding control unit
131 Amount-of-transferred-data prediction unit
132 Block determination unit
140, 150, 160 Macroblock decoding unit
141 Inverse quantization unit
142 Inverse orthogonal transform unit
143 Intra prediction unit
144 Motion compensated prediction unit
145 Adder circuit
170 Deblocking filter unit
180 Neighboring MB information memory
200 Other device
300 External memory transfer amount control unit
400 Integrated circuit
501 Start code
502 SPS header
503 PPS header
504 Slice header
505 Slice data

The invention claimed is:

1. An image decoding device that decodes coded image data on a block-by-block basis, the coded image data being resulted from coding, on a block-by-block basis, of image data partitioned into blocks each of which has a predetermined number of pixels, said image decoding device comprising:
a storage unit configured to store data of at least one reference image to be referred to for decoding the coded image data;
a pre-decoding unit configured to decode, on a block-by-block basis, reference information indicating a number of reference images to be referred to on a block-by-block basis for decoding the coded image data;
an amount-of-transferred-data prediction unit configured to calculate, on a block-by-block basis using the reference information, a predictive data amount of a reference image to be read out on a block-by-block basis from said storage unit for decoding the coded image data;
a block determination unit configured to determine, using the predictive data amount calculated, multiple blocks in the coded image data which are to be decoded in parallel, in such a manner as to reduce variation in amounts of data read out from said storage unit; and
block decoding units configured to decode in parallel the determined multiple blocks in the coded image data.

2. The image decoding device according to claim 1,
wherein said pre-decoding unit is configured to variable-length decode, as the reference information, macroblock type information provided for each of macroblocks that are the blocks, the macroblock type information being included in the coded image data, and
said amount-of-transferred-data prediction unit is configured to calculate the predictive data amount by multiplying the number of reference images indicated in the macroblock type information by a data amount per reference image.

3. The image decoding device according to claim 1,
wherein, in the case where said block decoding units decode the coded image data with reference to a reference image on a partition block-by-partition block basis, where partition blocks are resulted from partitioning of each block of the coded image data into smaller blocks,
said pre-decoding unit is configured to further decode block partition type information indicating a size of the partition blocks, the block partition type information being included in the coded image data, and
said amount-of-transferred-data prediction unit is configured to calculate the predictive data amount for each of the partition blocks having the size indicated in the block partition type information, further by weighting a data amount of a reference image located at an integer-pixel position and a data amount of a reference image located at a sub-pixel position, using a probability of reference to the reference image located at the integer-pixel position and a probability of reference to the reference image located at the sub-pixel position.

4. The image decoding device according to claim 3,
wherein said amount-of-transferred-data prediction unit is configured to calculate the predictive data amount on a partition block-by-partition block basis by assuming that:
a first probability is a probability of reference to a first reference image whose horizontal and vertical positions are both integer-pixel positions;
a second probability is a probability of reference to a second reference image whose horizontal position is a sub-pixel position and whose vertical position is an integer-pixel position;
a third probability is a probability of reference to a third reference image whose horizontal position is an integer-pixel position and whose vertical position is a sub-pixel position; and
a fourth probability is a probability of reference to a fourth reference image whose horizontal and vertical positions are both sub-pixel positions, and
by multiplying data amounts of the first, second, third, and fourth reference images by the first, second, third, and fourth probabilities, respectively, and adding up the resulting products.

5. The image decoding device according to claim 1,
wherein said pre-decoding unit is configured to further decode, on a block-by-block basis, motion information indicating an amount of motion between an image of a current block to be decoded and a reference image, and
said amount-of-transferred-data prediction unit is configured to calculate the predictive data amount on a block-by-block basis by further using the motion information.

6. The image decoding device according to claim 5,
wherein said amount-of-transferred-data prediction unit is configured to determine whether or not the reference image indicated in the motion information is located at a sub-pixel position, and in the case of determining that the reference image is located at a sub-pixel position, calculate a data amount of the reference image located at the sub-pixel position as the predictive data amount.

7. The image decoding device according to claim 5,
wherein said amount-of-transferred-data prediction unit is configured to determine whether or not an address of the reference image indicated in the motion information is an aligned address, and in the case of determining that the address of the reference image is not an aligned address, correct the address of the reference image to an aligned address to calculate the predictive data amount.

8. The image decoding device according to claim 1,
wherein said block determination unit is configured to determine, using the predictive data amount, multiple blocks in the coded image data which are to be decoded in parallel, by rearranging a decoding order of the blocks in the coded image data in such a manner as to reduce variation in the amounts of data read out from said storage unit.

9. The image decoding device according to claim 1,
wherein said block determination unit is configured to determine, using the predictive data amount, multiple blocks in the coded image data which are to be decoded in parallel, by changing the number of blocks to be decoded in parallel in such a manner as to reduce variation in the amounts of data read out from said storage unit.

10. The image decoding device according to claim 8,
wherein said block determination unit is configured to determine multiple blocks in the coded image data which are to be decoded in parallel such that an average of predictive data amounts calculated for the multiple blocks to be decoded in parallel approaches an average of predictive data amounts calculated for a predetermined number of blocks.

11. The image decoding device according to claim 8,
wherein said block determination unit is configured to determine multiple blocks in the coded image data which are to be decoded in parallel such that a sum of predictive data amounts calculated for the multiple blocks to be decoded in parallel approaches a differential data amount, the differential data amount being a data amount obtained by subtracting an amount of data transferred for another device from a maximum amount of data transferable from said storage unit.

12. The image decoding device according to claim 11,
wherein said block determination unit is configured to determine multiple blocks in the coded image data which are to be decoded in parallel such that the sum of predictive data amounts calculated for the multiple blocks to be decoded in parallel increases when the differential data amount is larger.

13. The image decoding device according to claim 11,
wherein said block determination unit is configured to determine multiple blocks in the coded image data which are to be decoded in parallel such that the sum of predictive data amounts calculated for the multiple blocks to be decoded in parallel decreases when the differential data amount is smaller.

14. An image decoding method of decoding coded image data on a block-by-block basis, the coded image data being resulted from coding, on a block-by-block basis, of image data partitioned into blocks each of which has a predetermined number of pixels, said image decoding method comprising:
pre-decoding, on a block-by-block basis, reference information indicating a number of reference images to be referred to on a block-by-block basis for decoding the coded image data;
calculating, on a block-by-block basis using the reference information, a predictive data amount of a reference image to be read out on a block-by-block basis from a storage unit for decoding the coded image data, the storage unit storing data of at least one reference image to be referred to for decoding the coded image data;
determining, using the predictive data amount calculated, multiple blocks in the coded image data which are to be decoded in parallel, in such a manner as to reduce variation in amounts of data read out from the storage unit; and
decoding in parallel the determined multiple blocks in the coded image data.

15. An integrated circuit that controls an image decoding device which decodes coded image data on a block-by-block basis, the coded image data being resulted from coding, on a block-by-block basis, of image data partitioned into blocks each of which has a predetermined number of pixels, said integrated circuit comprising:
a pre-decoding unit configured to decode, on a block-by-block basis, reference information indicating a number of reference images to be referred to on a block-by-block basis for decoding the coded image data;
an amount-of-transferred-data prediction unit configured to calculate, on a block-by-block basis using the reference information, a predictive data amount of a reference image to be read out on a block-by-block basis from a storage unit for decoding the coded image data, the storage unit storing data of at least one reference image to be referred to for decoding the coded image data;

a block determination unit configured to determine, using the predictive data amount calculated, multiple blocks in the coded image data which are to be decoded in parallel, in such a manner as to reduce variation in amounts of data read out from the storage unit; and block decoding units configured to decode in parallel the determined multiple blocks in the coded image data.

16. A non-transitory computer-readable medium having stored thereon a program for decoding coded image data on a block-by-block basis, the coded image data being resulted from coding, on a block-by-block basis, of image data partitioned into blocks each of which has a predetermined number of pixels, said program causing a computer to execute:

pre-decoding, on a block-by-block basis, reference information indicating a number of reference images to be referred to on a block-by-block basis for decoding the coded image data;

calculating, on a block-by-block basis using the reference information, a predictive data amount of a reference image to be read out on a block-by-block basis from a storage unit for decoding the coded image data, the storage unit storing data of at least one reference image to be referred to for decoding the coded image data;

determining, using the predictive data amount calculated, multiple blocks in the coded image data which are to be decoded in parallel, in such a manner as to reduce variation in amounts of data read out from the storage unit; and decoding in parallel the determined multiple blocks in the coded image data.

* * * * *